United States Patent
Ikegami et al.

(10) Patent No.: US 6,724,507 B1
(45) Date of Patent: Apr. 20, 2004

(54) IMAGE PROCESSING METHOD AND IMAGE PROCESSING APPARATUS

(75) Inventors: Hiroaki Ikegami, Nakai-machi (JP); Hitoshi Ogatsu, Nakai-machi (JP); Ryosuke Higashikata, Nakai-machi (JP); Takahide Inoue, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/345,783

(22) Filed: Jul. 1, 1999

(30) Foreign Application Priority Data

Jul. 2, 1998 (JP) .......................................... 10-187308

(51) Int. Cl.⁷ ............................................... G03F 3/08
(52) U.S. Cl. ...................... 358/518; 358/501; 358/519
(58) Field of Search ................................ 358/518, 519, 358/500, 501, 504; 382/162, 166, 167; 345/419, 590, 991, 604, 619, 620, 625; 348/395.1

(56) References Cited

U.S. PATENT DOCUMENTS

| | | | |
|---|---|---|---|
| 5,185,661 A | * 2/1993 | Ng | 358/505 |
| 5,319,473 A | * 6/1994 | Harrington | 358/501 |
| 5,334,992 A | * 8/1994 | Rochat et al. | 345/22 |
| 5,363,477 A | * 11/1994 | Kuragano et al. | 395/126 |
| 5,555,320 A | * 9/1996 | Irie et al. | 382/255 |
| 5,724,442 A | * 3/1998 | Ogatsu et al. | 382/167 |
| 5,748,342 A | * 5/1998 | Usami | 358/500 |
| 5,790,261 A | * 8/1998 | Hayashi et al. | 358/296 |
| 5,933,253 A | * 8/1999 | Ito et al. | 358/500 |
| 6,151,136 A | * 11/2000 | Takemoto | 358/1.9 |
| 6,301,383 B1 | * 10/2001 | Ito et al. | 382/162 |

FOREIGN PATENT DOCUMENTS

| | | | |
|---|---|---|---|
| EP | 930776 | * 7/1999 | H04N/1/60 |
| JP | 6-162181 | 6/1994 | |
| JP | 7-203234 | 8/1995 | |
| JP | 8-274997 | 10/1996 | |

OTHER PUBLICATIONS

P–Chieh Hung, "Color Management System and Color Space"; Color Forum Japan '95 Proceedings; Oct. 25, 199 pp. 44–48.*
Inter Color Profile Format, version 3.0, Jun. 10, 1994, 1 page.*
Po–Chieh Hung, "Color Management System and Color Space"; Color Forum Japan '95 Proceedings; Oct. 25, 1995; pp. 44–48.
Inter Color Profile Format, version 3.0, Jun. 10, 1994, 1 page.
InterColor Profile Format, Version 3.0, Jun. 10, 1994.
Po–Chieh Hung, "Color Management and Color Space," *Color Forum Japan '95 Proceedings,* Oct. 25–26, 1995, pp. 45–48.

* cited by examiner

*Primary Examiner*—Mark Wallerson
(74) *Attorney, Agent, or Firm*—Morgan Lewis & Bockius LLP

(57) ABSTRACT

Provided is an image processing method and a apparatus of converting a color input image or a partial region thereof in accordance with a color gamut of a color image output apparatus is provided. The method and apparatus is characterized in that only the region requiring color gamut compression can be put to color gamut compression depending on the distribution of an input image, that the direction of the color gamut compression can be controlled continuously for each of the regions; the amount of the color gamut compression can be controlled continuously including clipping, that when color gamut compression is conducted by a color converter of a multi-dimensional DLUT interpolating calculation type, an excessively unnecessary color gamut compression can be avoided particularly upon clipping, and that there is enabled correction for visual bending in iso-hue lines caused by distortion of a color space in each of the regions of the color space.

46 Claims, 18 Drawing Sheets

$$R1 = \frac{\text{DISTANCE FROM FIXED POINT TO CONVERSION TARGET POINT}}{\text{DISTANCE FROM FIXED POINT TO INPUT COLOR GAMUT POINT}}$$

$$R2 = \frac{\text{DISTANCE FROM FIXED POINT TO OUTPUT COLOR GAMUT POINT}}{\text{DISTANCE FROM FIXED POINT TO INPUT COLOR GAMUT POINT}}$$

IMAGE PROCESSING METHOD AND IMAGE PROCESSING APPARATUS

BACKGROUND OF THE INVENTION

1. Field of the Invention

The present invention concerns an image processing method and an image processing apparatus for compressing or expanding a color gamut of a color input image or a partial region thereof in accordance with the color gamut of a color image output apparatus such as a color printer or a color display.

2. Description of the Prior Art

A color image output apparatus such as color printers or color displays cannot reproduce all of visually perceptible colors and can reproduce those colors within a limited range referred to as a color gamut. On the contrary, since color input images have no restriction for the expressible range by image data, colors out of the color gamut of the output apparatus may possibly be inputted as input images, in which processing for converting the input image within the color gamut of the output apparatus, that is, processing of compressing the color gamut of the input image (color expression range) within the color gamut of the output apparatus.

On the contrary, if the input image is contained within the color gamut of the output apparatus, it is possible to conduct a processing referred to as color gamut expansion of converting the input image to an image of higher quality by effectively utilizing the color gamut of the output apparatus, for example, by making the chroma higher.

As the prior art concerning the color gamut compression, three methods, namely, Perceptual, Saturation and Colorimetric described in International Color Consosium Format proposed by International Color Consosium have been well known (See http://www.color.org).

Perceptual is a method of changing not only the colors out of the color gamut but also the colors within the color gamut of the output apparatus using a predetermined ratio while keeping hues and compressing the color gamut toward a fixed point on a gray axis within the color gamut of the output apparatus.

Saturation is a method of clipping only the colors out of the color gamut of the output apparatus to the color gamut surface of the output apparatus toward a fixed point on a gray axis within the color gamut of the output apparatus while keeping the hue.

Colorimetric is a method of clipping only the colors out of the color gamut of the output apparatus to the color gamut surface of the output apparatus toward a gray axis in the color gamut of the output apparatus while preserving the lightness and the hue.

SUMMARY OF THE INVENTION

However, since Perceptual compresses the input image always using a predetermined ratio irrespective of the hue and the lightness of the input image, it involves a problem of compressing also the colors in the region of hue or lightness not requiring compression.

Further, since Saturation and Colorimetric also clip the colors out of the color gamut of the output apparatus to the color gamut surface of the output apparatus irrespective of the hue and the lightness of the input image, they involve a problem that when a color similar to the color after converting the color out of the color gamut of the output apparatus to the color gamut surface of the output apparatus is present in the input image of the original image in the color gamut of the output apparatus, distinguishability between the both colors is deteriorated and, if there is a gradation outside of the color gamut of the output apparatus, the gradation may possibly be lost by the processing.

Further, when the Saturation or Colorimetric is attained by a multi-dimensional DLUT interpolating calculation type color converter adapted to retrieve a multi-dimensional DLUT (Direct Look Up Table) using upper bits of the input image data as the address, and obtaining output image data by interpolating calculation of the thus read out lattice point data by using lower bits in the input image data, if the lattice point data is defined by clipping the lattice point data out of the color gamut of the output apparatus to the color gamut surface of the output apparatus, it gives rise to a problem that colors in the color gamut and in the vicinity of the color gamut surface of the output apparatus are also compressed unnecessarily.

For the problems described above, there have been proposed, for example, (1) a method of selecting a conversion system considered the most preferred among the three types of the methods described above depending on the type of originals such as photographs or graphics used for business use, (2) a method of counting the number of pixels within and outside the color gamut of the output apparatus in the input image and selecting the conversion system in accordance with the ratio between them as shown in Japanese Published Unexamined Patent Application No. Hei 6-162181 and (3) a method of counting the number of pixels within and outside of the color gamut of the output apparatus in the input image and continuously changing the compression amount in accordance with the ratio thereof as shown in Japanese Published Unexamined Patent Application No. Hei 8-274997.

However, even these methods cannot basically overcome the foregoing problems since they essentially utilize Perceptual, Saturation or Colorimetric.

Further, Japanese Published Unexamined Patent Application No. Hei 7-203234 discloses a method of dividing an uniform color space into unitary regions, determining the number of pixels contained in the input image on every unitary region and mapping an image to other unitary regions of an equal lightness in accordance with the number of pixels for the unitary region out of the color gamut of the output apparatus.

However, since the method conducts color mapping only to the unitary regions out of the color gamut of the output apparatus, color continuity is deteriorated by the color conversion in the region outside of the color gamut of the output apparatus, for example, for the gradation continuous from the inside to the outside of the color gamut of the output apparatus to bring about a problem of being incapable of expressing a desired gradation.

Japanese Published Unexamined Patent Application No. Hei 7-203234 discloses processing by dividing a color gamut into small blocks as a method of color gamut compression corresponding to visual bending of hue lines in a color stage as reported, for example, in articles 4-1 of Color Forum Japan 95 (p. 45–48) in addition to the problems described above.

However, the method involves a problem of being incapable of correcting with visual bending of hue lines within a small block and incapable of ensuring continuity between the blocks.

From the foregoing, it is an object of the present invention to attain the following features. (1) Only the region requiring color gamut compression can be put to color gamut compression depending on the distribution of an input image. (2) The direction of the color gamut compression can be controlled continuously for each of the regions. (3) The amount of the color gamut compression can be controlled continuously including clipping. (4) When color gamut compression is conducted by a color converter of a multi-dimensional DLUT interpolating calculation type, an excessively unnecessary color gamut compression can be avoided particularly upon clipping.

Another object of the present invention is to enable correction for visual bending caused by distortion of a color space in each of the regions of the color space.

The foregoing object of the present invention can be attained in accordance with a first feature by an image processing method, comprising:

an output color gamut point calculation step of determining an output color gamut point as an intersection between a base line that is a line extending from the fixed point in the color gamut of the output apparatus to the conversion target point and an output color gamut surface itself or a closed curved surface inside the color gamut of the output apparatus;

an input color gamut point calculation step of determining an input color gamut point as an intersection between the base line and an color gamut surface of the input image or the partial region thereof;

a first conversion point calculation step of determining a first conversion point on the base line using the fixed point, the output color gamut point and a first weighing coefficient;

a second conversion point calculation step of determining a second conversion point by using correction data for correcting the compressing direction or expanding direction and the first weighing coefficient; and a final conversion point calculation step of determining a final conversion point for the conversion target point by using the first conversion point, the second conversion point and a second weighing coefficient.

The foregoing object is also attained in accordance with a second feature by an image processing method, comprising the steps of:

previously setting a correction vector for correcting visual bending of a hue line for each region of a color space; and converting the input image or the partial region thereof by using the correction vector.

The foregoing object is also attained in accordance with a third feature by an image processing method, comprising:

a correction point calculation step of calculating a correction point by correcting a conversion target point using a correction data corresponding to the conversion target point;

a compression/expansion processing step of calculating a conversion point by compressing or expanding a correction point to a point on a line connecting a fixed point in a color gamut of the output apparatus, that is determined uniquely based on the conversion target point, with the correction point; and an inversion correction point calculation step of correcting the conversion point or the second conversion point to get the final conversion point using inverse correction data corresponding to the conversion point or the second conversion point.

In the image processing method according to the first feature of the present invention, an output color gamut point and an input color gamut point as intersections between a base line extending from a fixed point to a conversion target point and an output color gamut surface and an input color gamut surface are determined, and then a first conversion point is determined as a point on the base line in the hue keeping direction on one hand and a second conversion point is determined which can be a direction for changing the hue on the other hand, and a final conversion point is determined as a point on a segment connecting the first conversion point and the second conversion point.

Accordingly, only the region requiring the color gamut compression can be put to color gamut compression depending on the distribution of the input image by the setting for the first weighing coefficient, the correction data and the second weighing coefficient, the direction of the color gamut compression can be controlled continuously for each of the regions, and the amount of the color gamut compression including clipping can also be controlled continuously. Further, by the same setting, excessively unnecessary color gamut compression can be avoided, particularly, upon clipping in a case of conducting color gamut compression by a color converter of a multi-dimensional DLUT interpolating calculation type.

In the image processing method according to the second feature of the present invention, since the color input image or the partial region thereof is converted by using a correction vector for correcting visual bending of hue lines, set to each region of the color space, the visual bending of the hue lines in the color space can be compensated in each of the region of the color space.

In the image processing method according to the third feature of the present invention, a final conversion point can be obtained on an ideal conversion curve passing the conversion target point and the fixed point by calculating a correction point by applying correction data corresponding to the conversion target point, determining the conversion point by compressing or expanding the correction point along a line passing through the correction point and a fixed point that is determined uniquely based on the conversion target point and calculating the final conversion point by conducting correction to the conversion point by the inverse correction data corresponding to the conversion point.

DESCRIPTION OF THE PREFERRED EMBODIMENTS

The present invention is to be explained by way of preferred embodiments in a case of conducting color gamut compression or color gamut expansion to a color input image (hereinafter simply referred to as an input image) or a partial region thereof on a CIELAB (L*a*b*) color space as an example. However, the present invention is applicable also to other color spaces such as CIELUV (L*u*v*), YIQ, YCbCr, XYZ and RGB.

Figure 1:
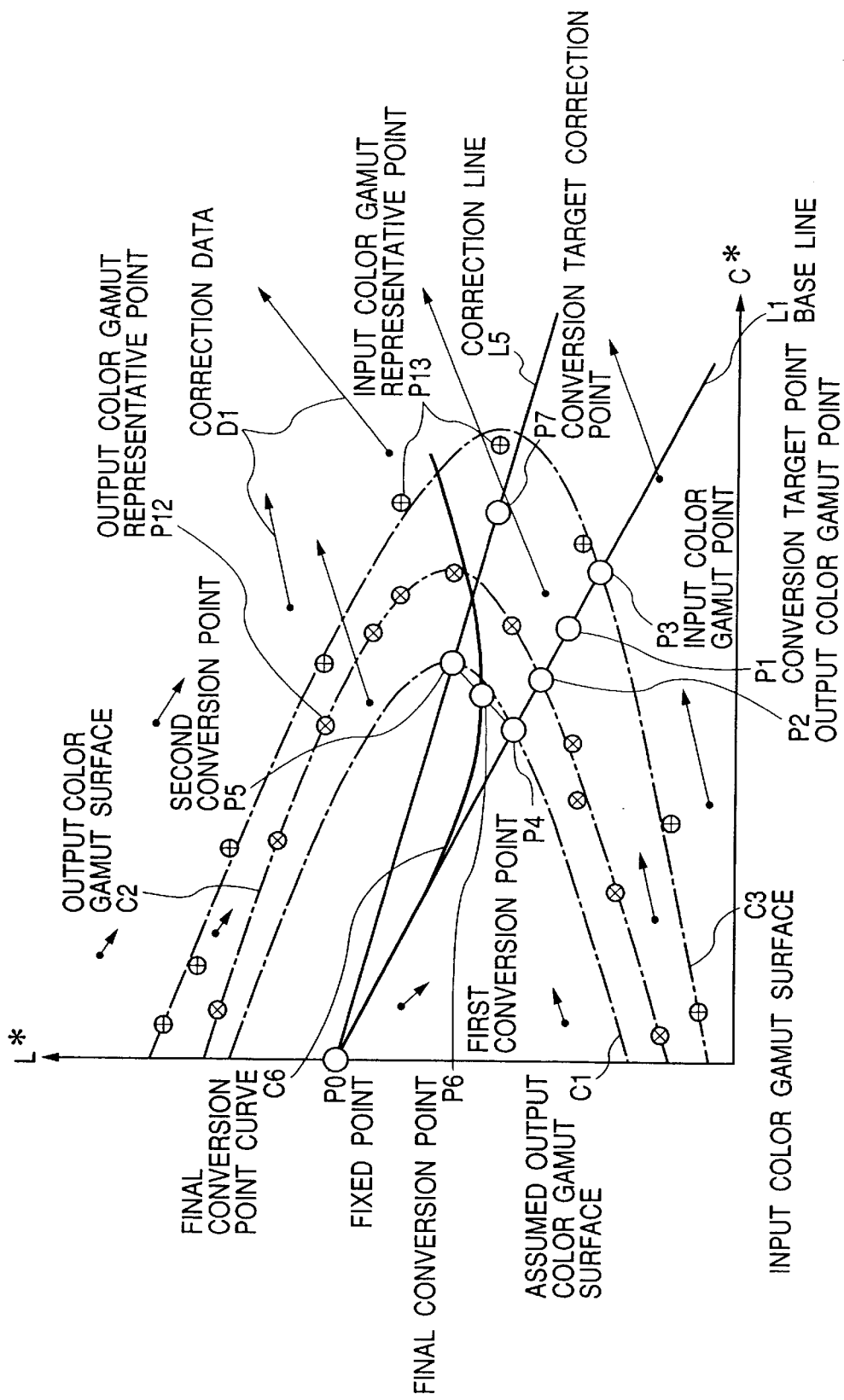
FIG. 1 is a view for explaining a method of processing an image according to a first invention.
Figure 2:
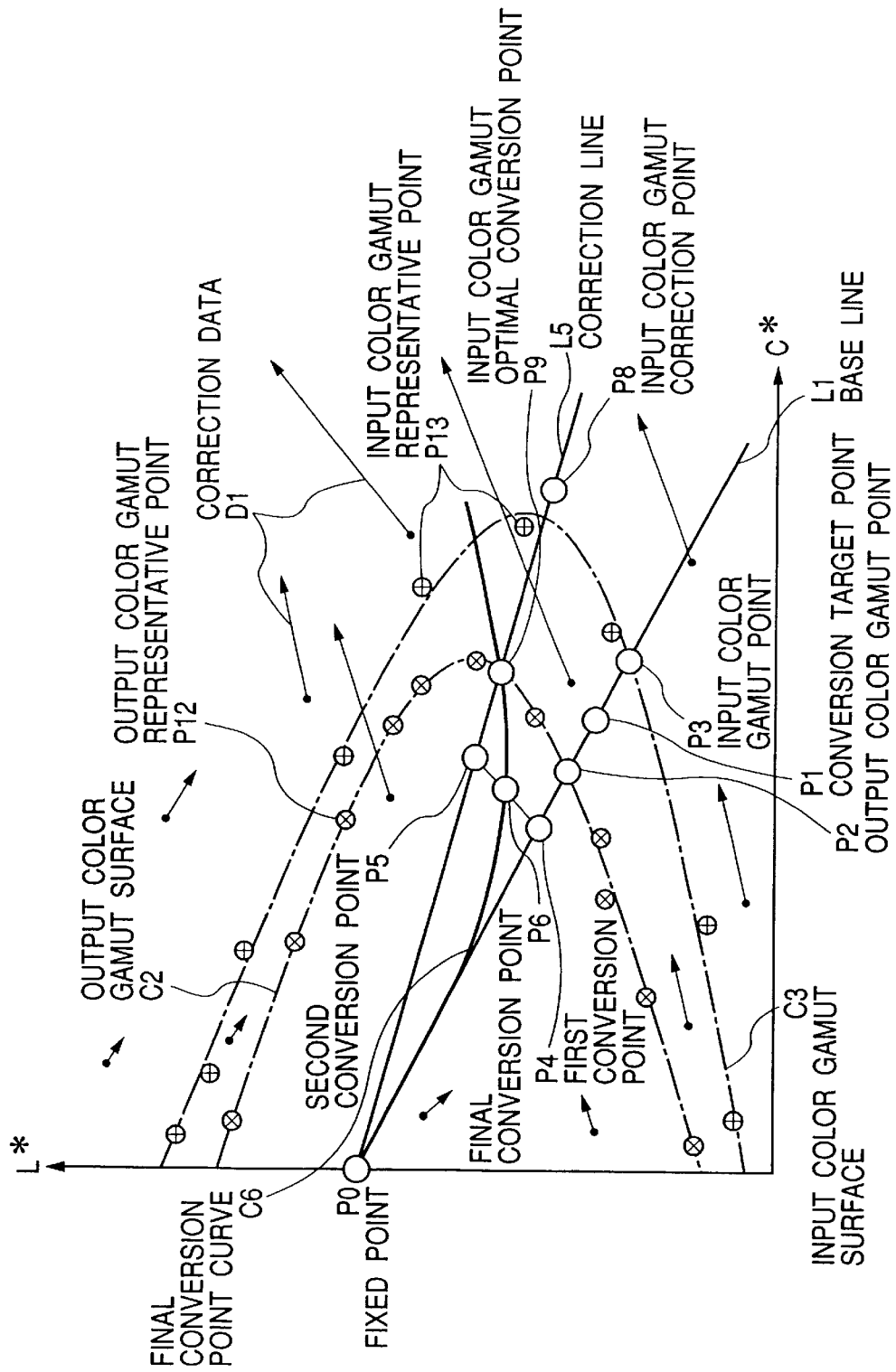
FIG. 2 is a view for explaining a method of processing an image according to a first invention.

The outline of the method according to the first invention is shown with reference to FIG. 1 or FIG. 2. FIG. 1 and FIG. 2 show a CIELAB color space in a two-dimensional manner by an L* axis as a lightness axis and C* axis as a chroma axis for the sake of convenience.

In FIG. 1 and FIG. 2, a point P0 in a color gamut of a color image output apparatus (hereinafter simply referred to as an output apparatus), and the point is set on a gray axis, that is, on the L* axis in the CIELAB color space as described later. The fixed point means hereinafter the fixed point P0 in the color gamut of the output apparatus.

A point P1 is a conversion target point represented by a color coordinate value of an input image or a partial region thereof. A line L1 is a line extending from the fixed point P0 to the conversion target point P1 and is defined as a base line.

A surface (curved surface) C2 is an output color gamut surface itself of an output apparatus or a closed curved surface inside the color gamut of the output apparatus to be set as will be described later and is defined as an output color gamut surface. A surface C3 is an color gamut surface of the input image or a partial region thereof and is defined as an input color gamut surface. FIG. 1 and FIG. 2 show a case in which the input color gamut surface C3 is at the outside of the output color gamut surface C2 and the conversion target point P1 is converted by compression. On the contrary, the method of the present invention is also applicable to a case in which the output color gamut surface C2 is at the outside of the input color gamut surface C3 and the conversion target point P1 is converted by expansion.

A point P2 is an intersection between the base line L1 and the output color gamut surface C2 and is defined as an output color gamut point.

A point P3 is an intersection between the base line L1 and the input color gamut surface C3 and is defined as an input color gamut point.

A point P4 is a first conversion point which is determined by weighted mean of the fixed point P0 and the output color gamut point P2 using a first weighing coefficient. Accordingly, the first conversion point P4 is a point on the base line L1.

A point P5 is a second conversion point which is determined by using correction data for correcting the compressing direction or the expanding direction using the first weighing coefficient.

A line L5 is a line extending from the fixed point P0 to a second conversion point P5 and is defined as a correction line.

In FIG. 1 and FIG. 2, the correction line L5 is different from the base line L1 but, if the correction data is zero, the correction line L5 agrees with the base line 11. The correction data is set and prepared as discrete data in the color space as shown, for example, in FIG. 1 and FIG. 2 as correction data D1.

A point P6 is a final conversion point for the conversion target point P1 and is determined by weighted means of the first conversion point P4 and the second conversion point P5 by using a second weighing coefficient. Accordingly, the final conversion point P6 is a point on a segment connecting the first conversion point P4 with the second conversion point P5.

Figure 18:
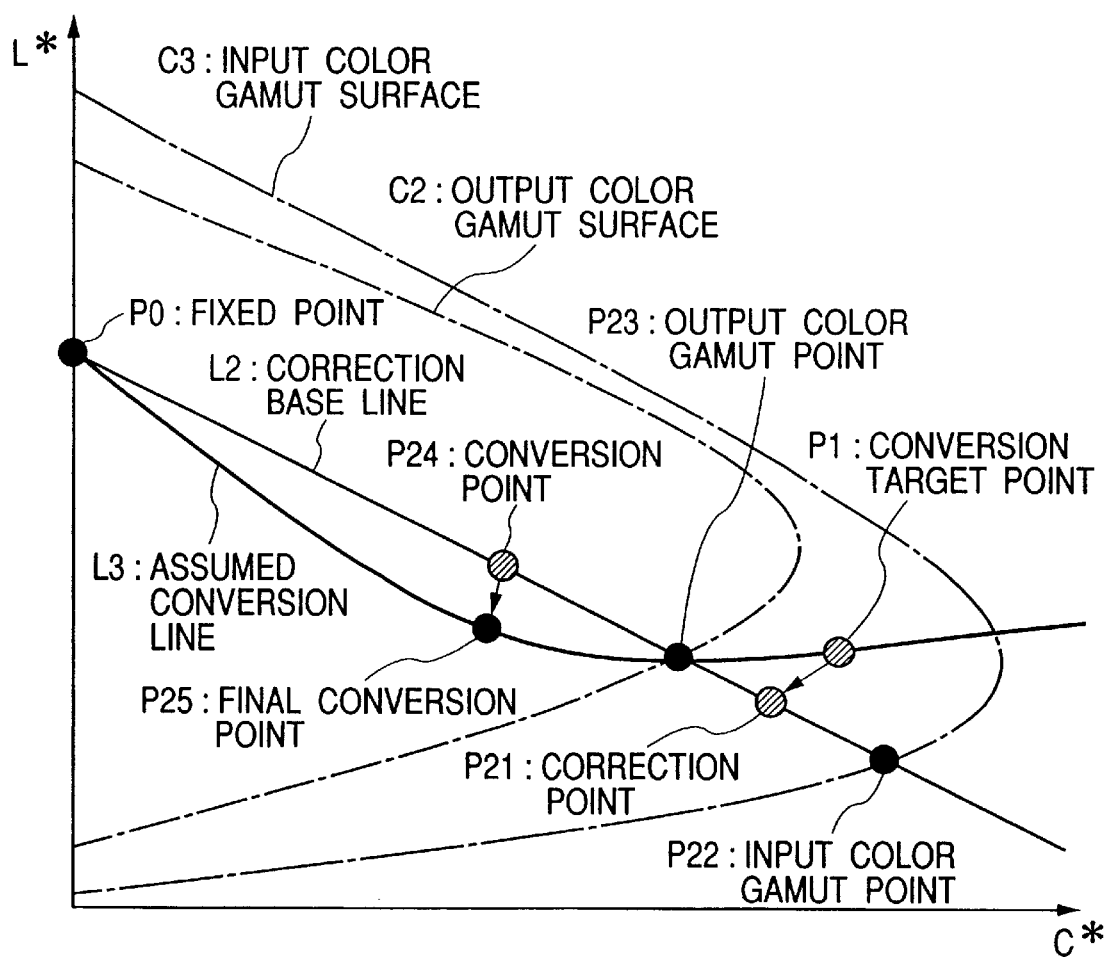
FIG. 18 is a view for explaining a method of processing images according to a third invention.
Figure 19:
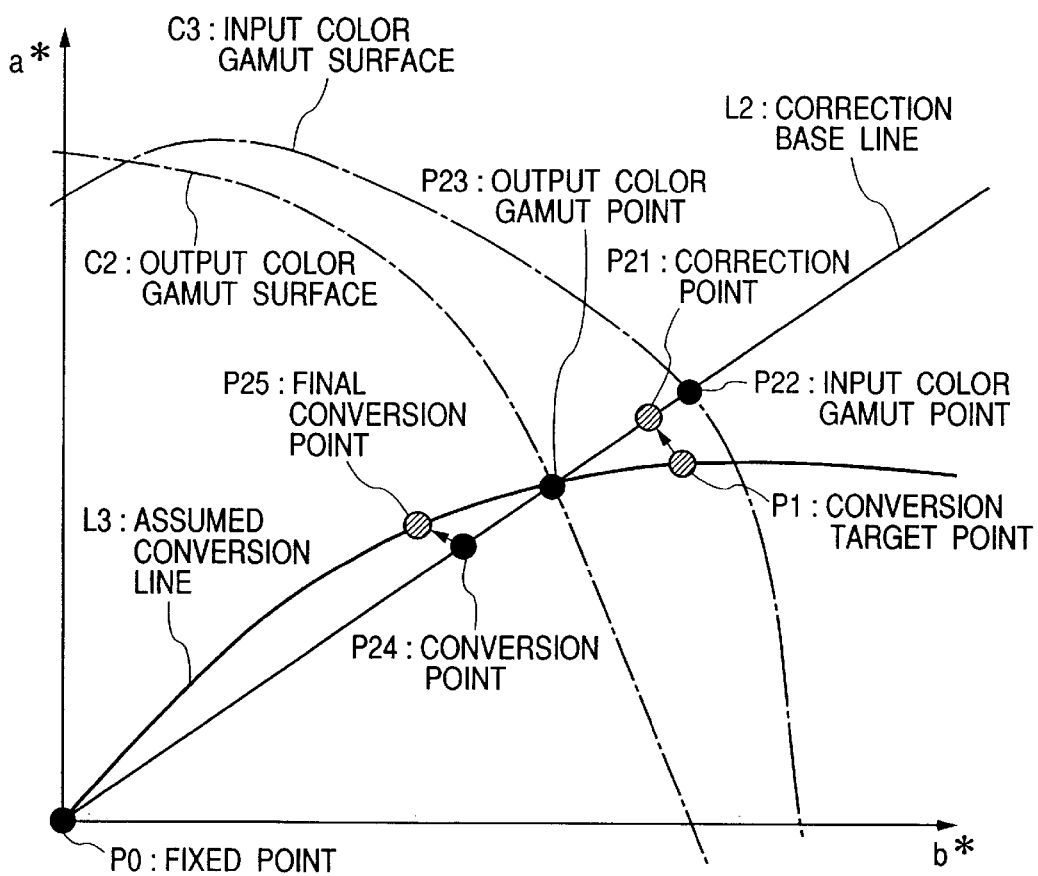
FIG. 19 is a view for explaining a method of processing images according to a third invention.

The outline of the method according to the third invention is shown with reference FIG. 18 and FIG. 19. FIG. 18 shows a CIELAB color space in a two-dimensional manner by using L* axis as a lightness axis and C* axis as a chroma axis, and FIG. 19 shows a CIELAB color space in a two-dimensional manner by using a* axis and b* axis.

As has been described above with respect to the first invention, also in FIG. 18 and FIG. 19, a point P0, a point P1, a curved surface C2 and a curved surface C3 are, respectively, a fixed point, a conversion target point, an output color gamut surface and an input color gamut surface.

A point P21 is a point calculated by applying correction data corresponding to the conversion target point P1 relative to the conversion target point P1 and is defined as a correction point. The correction data is provided as discrete vector data in the color space, and correction data corresponding to a necessary point can be calculated, for example, by interpolation.

A line L2 is a line connecting the correction point P21 with the fixed point P0 and is defined as a correction base line.

A curve L3 is a curve passing the conversion target point P1 and the fixed point P0 and is defined as an assumed conversion line. The correction data described above is calculated based on the assumed conversion line. The assumed conversion line is determined depending on the purpose and an iso-hue line passing the conversion target point P1 and the fixed point P0 is the assumed conversion line in a case, for example, of intending to correct bending of the hue line.

A point P22 is an intersection between a correction base line L2 and the input color gamut surface C3 and is defined as an input color gamut point.

A point P23 is an intersection between the correction base line and the output color gamut surface C2 and is defined as an output color gamut point.

A point P24 is a point obtained by compression or expansion corresponding to the color gamut of the output apparatus to the correction point P21 along the correction base line L2 and is defined as a conversion point. The compression or expansion processing corresponding to the color gamut of the output apparatus may be conducted by using the first weighing coefficient decided based on the fixed point P0, the input color gamut point P22, the output color gamut point P23 and the correction point P21, or may be conducted by an existing method.

A point P25 is a final conversion point for the conversion target point P1 and is calculated by applying inverse correction data corresponding to the conversion point P24. The inverse correction data is formed by replacing a start point and an end point of a vector of the correction data to each other.

Other points, surfaces and curves shown in FIG. 1, FIG. 2, FIG. 18 and FIG. 19 will be described later. The second invention will also be described later.

[Setting for the Fixed Point]

The fixed point P0 is set as a point fixed on a gray axis in a color gamut of the output apparatus, as a point changing continuously as a function of lightness, chroma and the like of the conversion target point P1 or as a point changing discretely in accordance with lightness, chroma and the like of the conversion target point P1.

Figure 3:
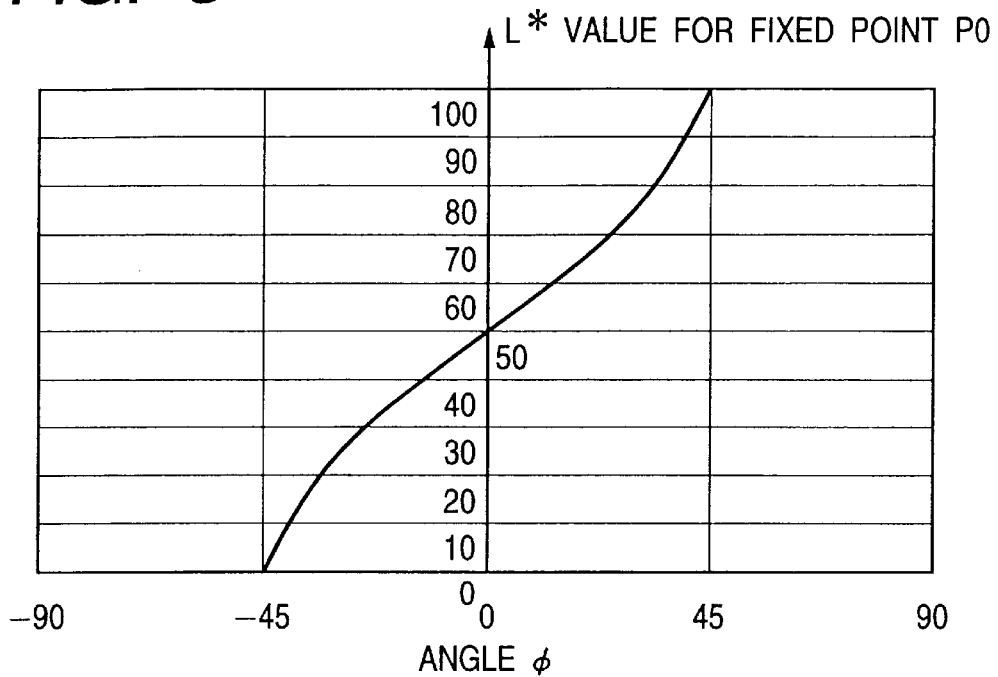
FIG. 3 is a view showing an example of setting a fixed point.

FIG. 3 shows an example of the fixed point P0 that changes continuously as a function of lightness, chroma and the like of the conversion target point P1. This shows a relation between an angle $\Phi$ and an L* value of the fixed point P0, assuming an angle made by a vector extending from the conversion target point P1 to the fixed point P0 relative to an a*b* plane as $\Phi$. When the fixed point P0 is defined as described above, the relation between the fixed point P0 and the conversion target point P1 is, for example, as shown in FIG. 4.

Figure 4:
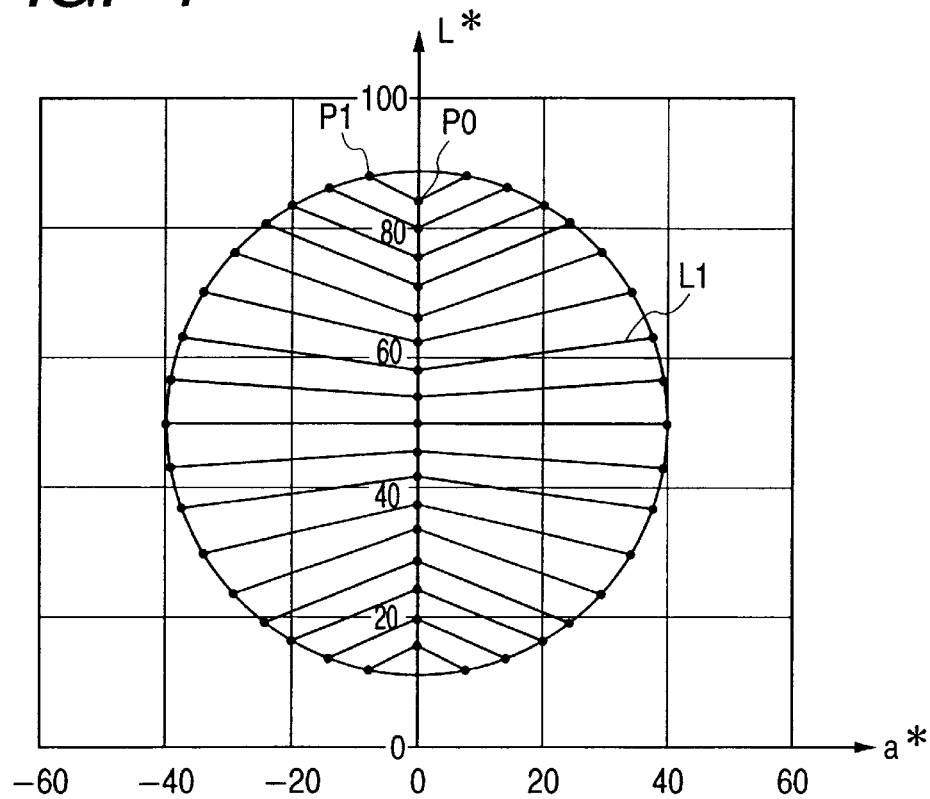
FIG. 4 is a view showing an example of setting a fixed point.

When the fixed point is set as a point changing continuously as a function of the lightness, chroma and the like of the conversion target point P1 or as a point changing discretely in accordance with the lightness, chroma and the like of the conversion target point P1 as described above, it is necessary that the base line L1 extending from the fixed point P0 to the conversion target point P1 does not intersect for the entire region in the color space as shown in FIG. 4. If the condition is not satisfied, a gradation may possibly be inverted upon compression or expansion.

When the fixed point P0 is set as a function only of the lightness of the conversion target point P1, the gradation is not inverted if the angle $\Phi$ is 0°. However, if angle $\Phi$ is other than the 0°, the gradation tends to be inverted at a high possibility and, if the lightness of the conversion target point P1 is out of the color gamut of the output apparatus, it is difficult to set the fixed point P0 in the color gamut of the output apparatus. The fixed point P0 is set while taking them into consideration.

[Output Color Gamut Surface]

The output color gamut surface C2 may usually be an color gamut surface for the color gamut of the output device. However, in a case where an output apparatus is a display or the like and white points of the input image are different from the white points of the output apparatus, it may sometimes be desirable that a closed curved surface inside the color gamut of the output apparatus is the output color gamut surface C2.

Figure 5:
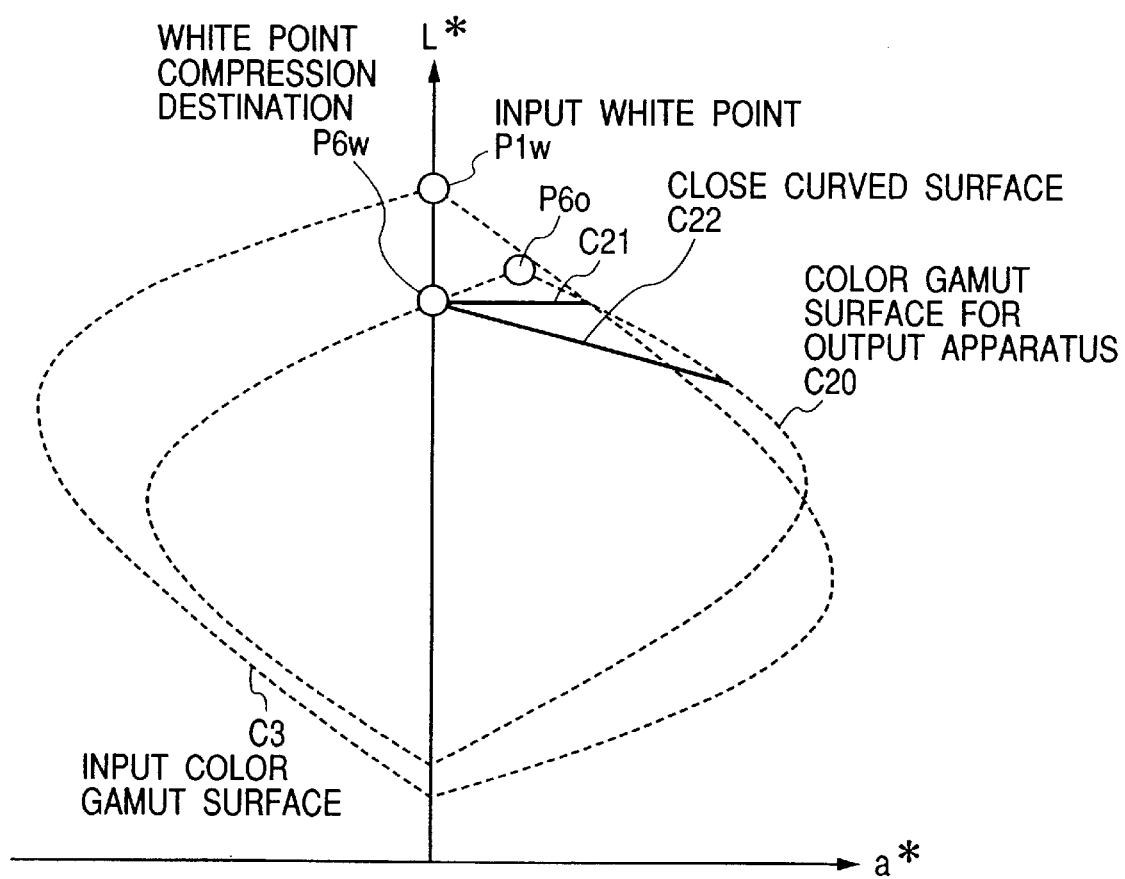
FIG. 5 is a view showing an example of setting an output color gamut surface.

FIG. 5 schematically shows an example of a relation between a color gamut of an input image or a partial region thereof and a color gamut of an output apparatus, in which a curved surface C20 is a color gamut surface itself of an output apparatus, a surface C3 is an input color gamut surface, that is, a color gamut surface of an input image or a partial region thereof.

In this example, when a white point P1w of an input image or a partial region thereof is converted to a compressed point P6w on a gray axis in the color gamut of the output apparatus, since a region of higher lightness than the white point compressed point P6w is present in the color gamut of the output apparatus, another color of the input image or the partial region thereof may sometimes be converted into a color P6o at higher lightness than that of the white point compressed point P6w depending on the compression method, to give an unnatural impression.

In such a case, a surface containing only the region of lower lightness than the white point compressed point P6w as a closed curved surface in the color gamut of the output apparatus may be set and used as the output color gamut surface C2. For example, in FIG. 5, a closed curved surface C21 extended horizontally starting from the white point compressed point P6w such that the lightness is equal to that of the white point compressed point P6w, or a closed curved surface C22 that gradually lowers the lightness as the chroma increases starting from the white point compressed point P6w is set as the closed curved surface in the color gamut of the output apparatus and used as an output color gamut surface C2.

As the chroma increases, a color feels visually brighter than gray at identical lightness but unnatural impression caused by such a visual phenomenon can be prevented by using the closed curved surface C22 of the latter as the output color gamut surface C2.

As a countermeasure for such a disadvantage in view of the visual sense, it may also be considered to conduct color gamut conversion after uniformly converting only the lightness at first for all the colors of the input image or the partial region thereof. However, when a color gamut expansion is conducted in addition to the color gamut compression, a similar disadvantage is also caused upon expansion, so that it is desirable to set the curved surface as the closed curved surface C22 as the output color gamut surface C2.

[First Embodiment as the Image Processing Method]

Figure 6:
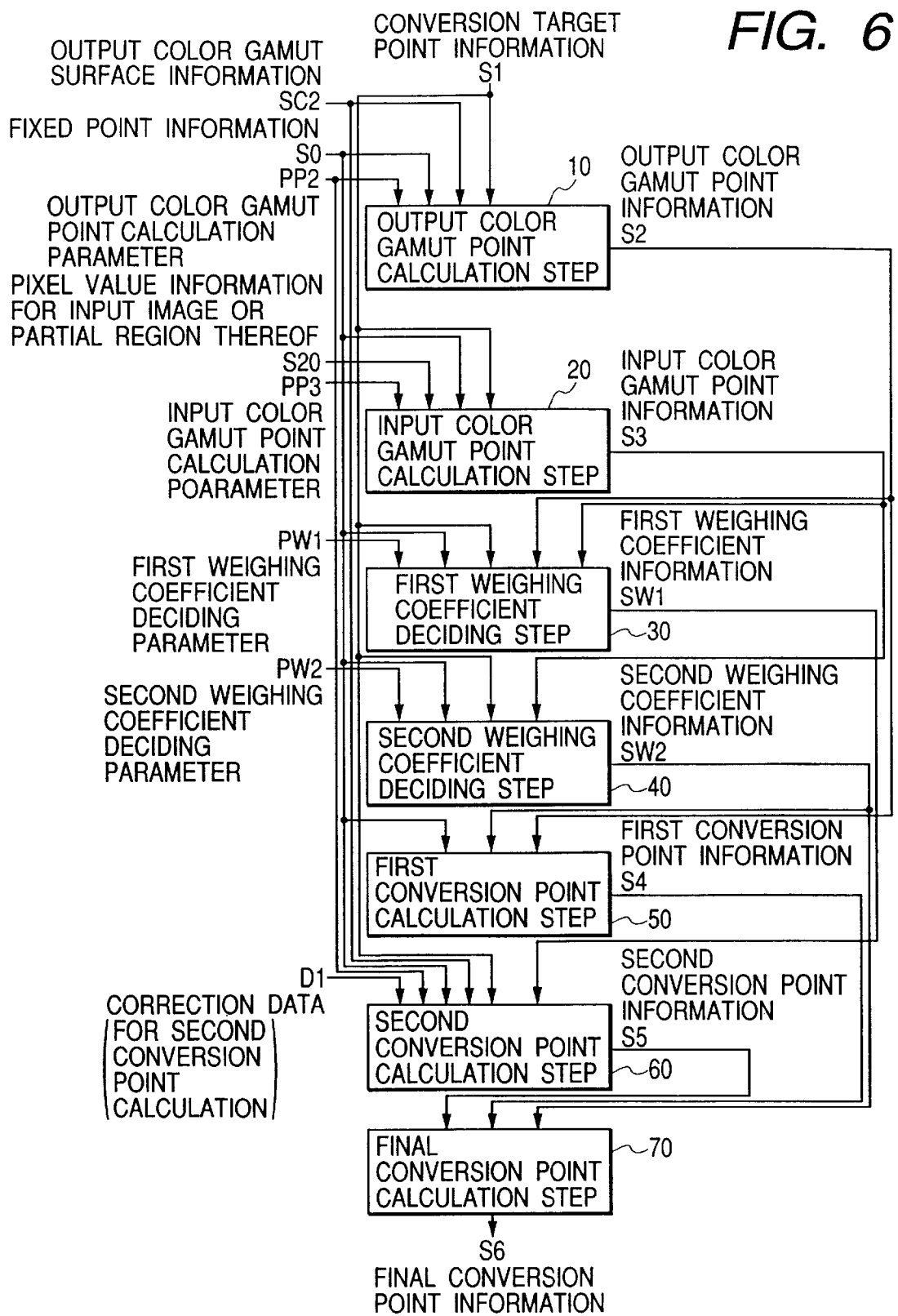
FIG. 6 is a view showing a first embodiment of the image processing method according to the present invention.

FIG. 6 shows a preferred embodiment of the first invention of determining a point in an input image or a partial region thereof, namely, a color coordination value for one pixel as the conversion target point P1 and converting the same into the final conversion point P6 of a color coordinate value adaptable to the color gamut of the output apparatus.

The method shown in FIG. 6 can be attained in a computer by means of a processing program but a portion of the steps can be executed also by hardware. This method comprises, as a whole, an output color gamut point calculation step 10, an input color gamut point calculation step 20, a first weighing coefficient deciding step 30, a second weighing coefficient deciding step 40, a first conversion point calculation step 50, a second conversion point calculation step 60 and a final conversion point calculation step 70. At first, the output color gamut point calculation step 10 or the input color gamut calculation step 20, for example, the output color gamut calculation step 10 is conducted.

(Output Color Gamut Point Calculation Step)

In the output color gamut point calculation step 10, information S2 for the output color gamut point P2 as an intersection between the base line L1, namely, a line extending from the fixed point P0 to the conversion target point P1 and the output color gamut surface C2 is calculated based on the information (color coordinate value) S1 for the conversion target point P1, information (color coordinate value) S0 for the fixed point P0, information SC2 for the output color gamut surface C2 and an output profile point calculation parameter PP2.

Figure 7:
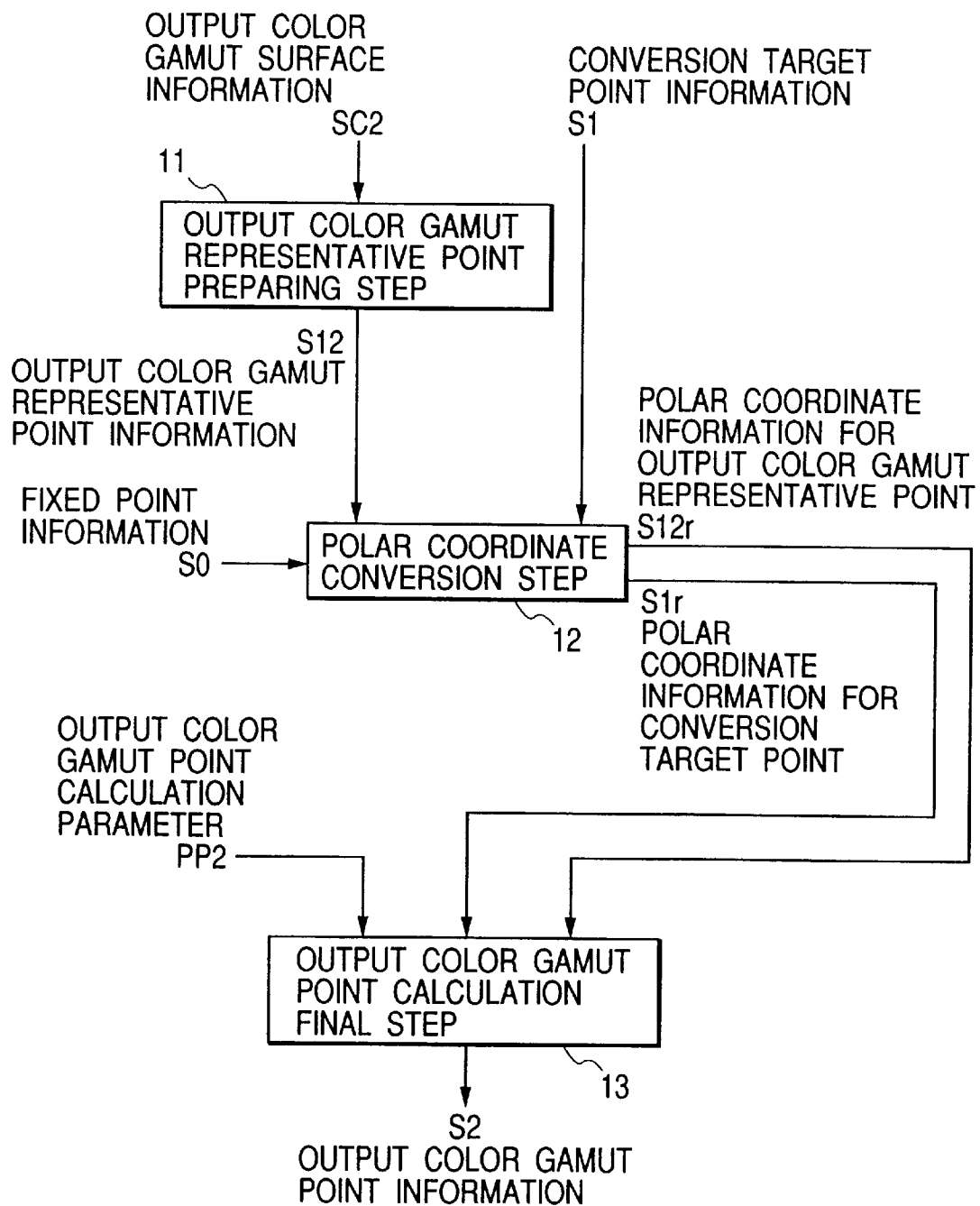
FIG. 7 is a view showing an example of an output color gamut point calculation step.

FIG. 7 shows a concrete example of the output color gamut point calculation step 10. In this example, information (color coordinate value) S12 for a plurality of output color gamut representative points C12 as shown in FIG. 1 and FIG. 2 is calculated based on the output color gamut surface information SC2 in the output color gamut representative point preparing step 11.

The output color gamut surface information SC2 is for the discrete data on the relation between the input signal and the output color depending on the output apparatus, as well as the shape of the output color gamut surface C2 if this is a closed curved surface in the color gamut of the output apparatus.

As the discrete data pair, data set for various YMC(K)% and LAB data may be provided, for example, when the output apparatus is a printer, or data set for various RGB and LAB data or XYZ may be provided when the output apparatus is a display.

Based on the data described above, a value to be predicted is set corresponding to a point on the color gamut surface of the output apparatus, and a color is predicted.

Setting of the value to be predicted to the point on the color gamut surface of the output apparatus corresponds to the provision of data comprising a combination of M% and C% when Y% is zero, a combination of C% and Y% when M% is zero and a combination of Y% and M% when C% is zero when the output apparatus is, for example, a three color printer.

Further, when the output color gamut surface C2 is a closed curved surface of the output apparatus, the color data on the color gamut surface in of the output apparatus is modified by using information regarding the shape thereof to form an output color gamut representative point information S12.

As the prediction method, it is possible to use a method of predicting any color outputted from an input signal of any input signal depending on the output apparatus information based on the discrete data pair regarding the relation between the input signal and the output color depending on the output apparatus. A known method can be utilized. Further, accurate predicting can be conducted by using a method proposed in Japanese Patent Application No. Hei 9-4949 (filed on Jan. 14, 1996).

The method of Japanese Patent Application No. Hei 9-4949 (hereinafter referred to as prior application) comprises linking a relation between an input signal and an output signal by means of a linear matrix equation including constant terms, and determining the weighing coefficient, the coefficient of the matrix equation and the predicted value successively by an approximate method so as to minimize the sum of squares for the output prediction value determined from a plurality of real input signal data items by using the matrix equation and the weighed Euclid distance of a plurality of real output signal data corresponding thereto.

In the output color gamut point calculation step 10 shown in FIG. 7, the conversion target point information S1 and the output color gamut representative point information S12 are converted into the polar coordinate with the fixed point P0 as the center, respectively, based on the fixed point information S0 in the polar coordinate conversion step 12 to obtain a conversion target point polar coordinate information S1$r$ and an output color gamut representative point polar coordinate information S12$r$.

Then, in the output profile point calculation final step 13, information (color coordinate value) S2 for the output color gamut point P2 is calculated based on the conversion target point polar coordinate information S1$r$, the output color gamut representative point polar coordinate information S12$r$ and the output color gamut point calculation parameter PP2.

Assuming the conversion target point polar coordinate as O (r$o$, θ$o$, φ$o$), and the output color gamut representative point polar coordinate as GOUTi (r$i$, θ$i$, φ$i$), in which i=1, Nout, calculation for an intersection between the base line L1 and the output color gamut surface C2 corresponds to predicting of the prediction value (r$o$) as a value to be predicted (θ$o$, φ$o$) based on N units of the data pair of (θ$i$ φ$i$) and r$i$. Accordingly, calculation can be conducted by using the known method or the method of the prior application.

Since this is the polar coordinate, the output color gamut calculation parameter PP2 may be determined in accordance with the number of the output color gamut representative points P12 while taking care of the continuity for θ, φ, for example, continuity between 0° and 360° of θ.

(Input Color Gamut Calculation Step)

In the entire step shown in FIG. 6, information S3 for the input color gamut point P3 as an intersection between the base line L1 and the input color gamut surface C3 is calculated in the input color gamut point calculation step 20, based on the conversion target point information S1, the fixed point information S0, the pixel value information S20 for the input image or the partial region thereof, and the parameter PP3 for input color gamut point calculation.

Individual pixel values per se of the input image or the partial region thereof may be used as the pixel value information S20 of the input image or the partial region thereof. Alternatively, when the color gamut of the input image or the partial region thereof is previously assumed, for example, as an NTSCRGB color gamut, an SRGB color gamut or a color gamut represented by YMCBRGWK color coordinate points, discrete color coordinate information located at the color gamut portion of the assumed color gamut may be used.

In a case of using discrete color coordinate information located at the color gamut portion of the previously assumed color gamut, the input color gamut representative point candidate selection step and the input color gamut representative point selection step shown below can be saved.

Figure 8:
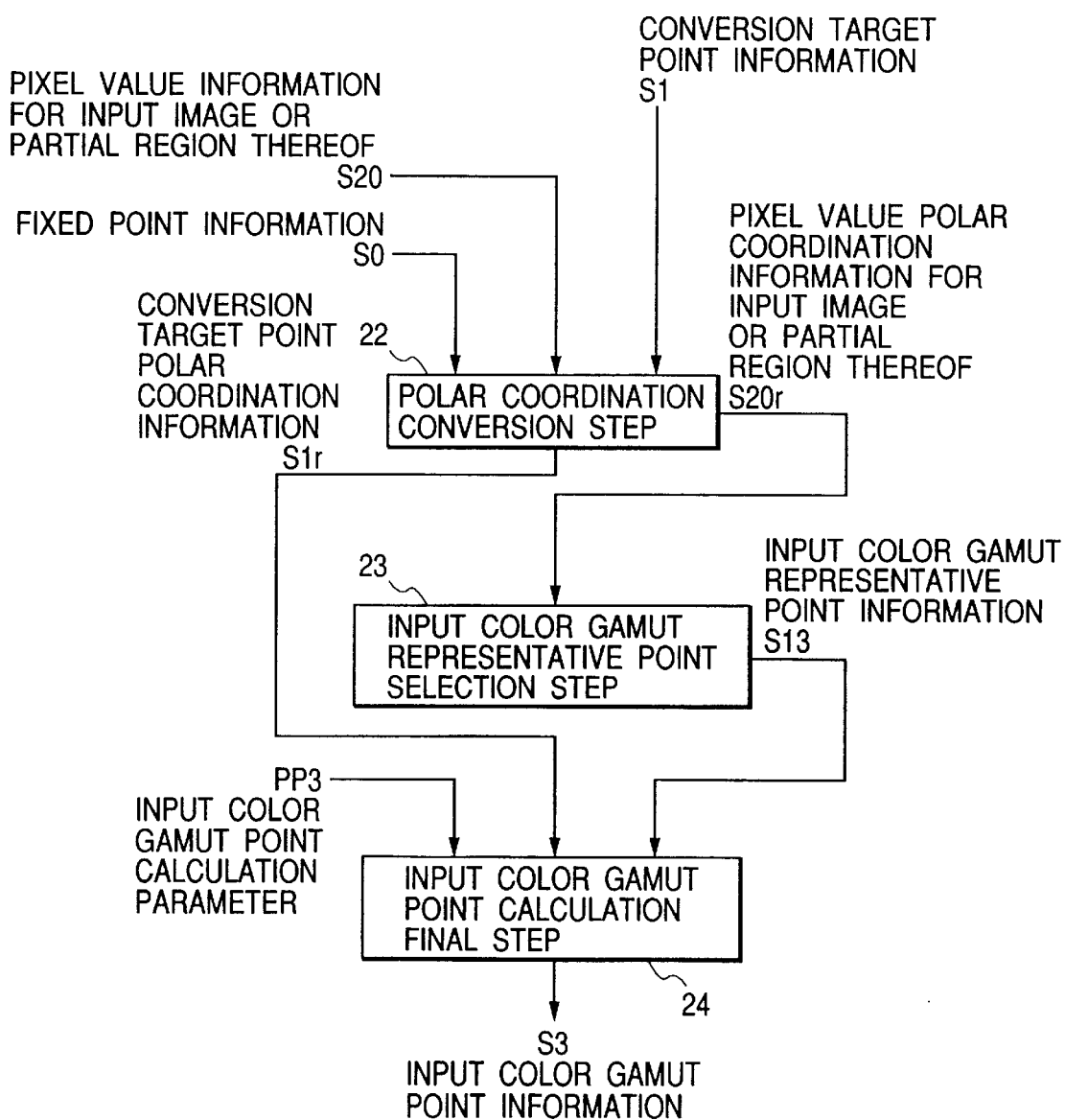
FIG. 8 is a view showing an example of an input color gamut point calculation step.
Figure 9:
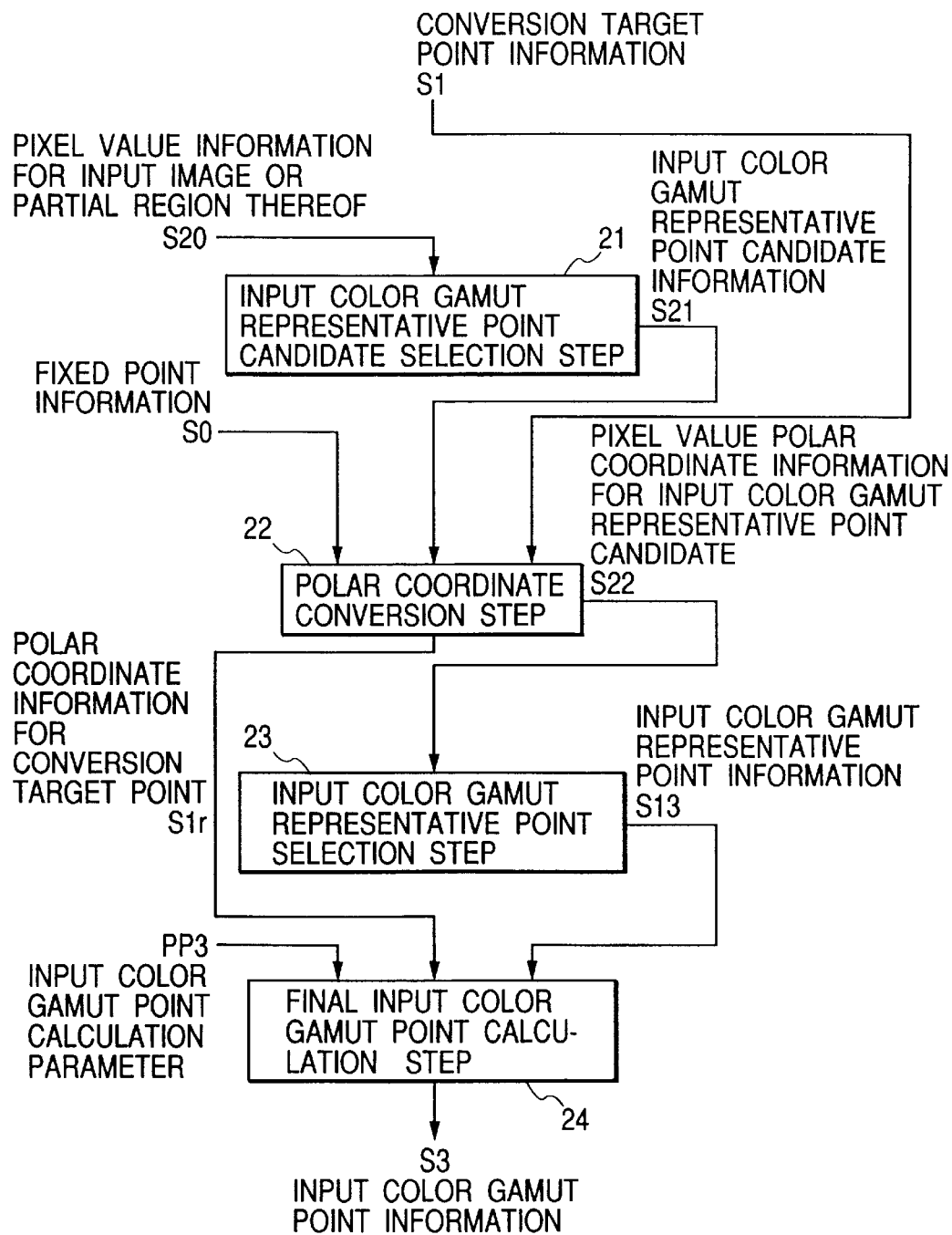
FIG. 9 is a view showing an example of an input color gamut point calculation step.

FIG. 8 and FIG. 9 show, respectively, concrete examples of the input color gamut provided point calculation step 20. FIG. 8 is an example of selecting the input color gamut representative points from all pixel values of the input image or the partial region thereof and FIG. 9 is an example of determining the input color gamut representative candidates, for example, by thinning pixels of the input image or the partial region thereof and selecting the input color gamut representative point from the input color gamut representative point candidates.

In the example shown in FIG. 8, pixel value information S20 of the input image or the partial region thereof is at first converted into the polar coordination with the fixed point P0 as the center based on the fixed point information S0 in the polar coordinate conversion step 22 to obtain pixel value polar coordinate information S20$r$. In this case, the conversion target point information S1 is also converted into the polar coordinate with the fixed point P0 as the center based on the fixed point information S0, to obtain a conversion target point polar coordinate information S1$r$. Since this has already been calculated in the polar coordinate conversion step 12 in the output color gamut point calculation step 10 shown in FIG. 7, this result may be utilized.

Then, information S13 for the input color gamut representative points P13 as the discrete points in the color gamut surface C3 as shown in FIG. 1 and FIG. 2 are selected from the pixel value polar coordinate information S20r in the input color gamut representative point selection step 23.

Specifically, assuming the pixel value polar coordinate of the input image or the partial region thereof as INi (ri, θi, φi), in which i=1, Nin, (θ, φ) plane is divided into meshes to distribute INi (ri, θi, φi), and data having maximum (r) in each of the meshes is sought and it is defined as an input color gamut representative point GINi (ri, θi, φi), in which i=1, Nin.

Then, in the input outmost profile calculation final step 24, information (color coordinate value) S3 for the input color gamut point P3 as an intersection between the base line L1 and the input color gamut surface C3 is calculated based on the conversion target point polar coordinate information S1r, the input color gamut representative point information S13 and the input color gamut point calculation parameter PP3.

Since the conversion target point polar coordinate is O (ro, θo, φo) and the input color gamut representative point P13 is GINi (ri, θi, φi), in which i=1, Nin, calculation for the intersection between the base line L1 and the input color gamut surface C3 corresponds to the predicting of the rediction value (ro) assuming the value to be predicted as (θo, φo) based on N units of the data pair of (θi, φi) and ri. Accordingly, it can be calculated by using the known method or the method of the prior application described above.

In this case, since this is the polar coordinate, the input color gamut point calculation parameter PP3 may be determined in accordance with the number of the input color gamut representative points P13 while taking care of the continuity between 0° and 360° for 74 , φ. However, since the input color gamut surface C3 as the color gamut surface for the color gamut of the input image or the partial region thereof may sometimes has remarkable unevenness compared with the case of calculating the output color gamut information S2, it is important in this case to set the parameter PP3 for the input color gamut point calculation so as to strengthen the smoothing effect.

In the example shown in FIG. 9, the information S21 for the input color gamut representative point candidates is obtained at first in the input color gamut representative point candidate selection step 21 from the pixel value information 20 of the input image or the partial region thereof.

When the input color gamut representative point is selected from the pixel value information S20 per se of the input image or the partial region thereof as in the example shown in FIG. 8, it takes much time for the processing in the polar coordinate conversion step 22 and the input color gamut representative point selection step 23. However, when the input color gamut representative point candidate is previously selected at the input color gamut representative point candidate selection step 21 as in the example shown in FIG. 9, the processing time in the subsequent polar coordinate conversion step 22 and the input color gamut representative point selection step 23 can be shortened. For selecting the input color gamut representative point candidate, a method, for example, of merely thinning pixels of the input image or the partial region thereof or determining a mean value for several pixels and determining the mean value as the input color gamut representative point candidate information S21 can be used.

Subsequently, in the same manner as in the example shown in FIG. 8, by way of the polar coordinate conversion step 22, the input color gamut representative point selection step 23 and the final input color gamut point calculation step 24, information S3 for the input color gamut point P3 as an intersection between the base line L1 and the input color gamut surface C3 is obtained.

(First Weighing Coefficient Deciding Step)

In the entire step shown in FIG. 6, information SW1 for a first weighing coefficient used in the subsequent first conversion point calculation step 50 and the second conversion step calculation step 60 is calculated next in the first weighing efficient deciding step 30 based on the conversion target point information S1, the fixed point information S0, the output color gamut point information S2, the input color gamut point information S3 and the first weighing coefficient deciding parameter PW1.

In the first weighing coefficient deciding step 30, the first weighing coefficient is decided by conducting 1-variable function calculation of inputting a ratio between a distance from the fixed point to the conversion target point and a distance from the fixed point to the input color gamut point and outputting the first weighing coefficient. The shape of the 1-variable function will be explained with reference to FIG. 10 and FIG. 11.

Figure 10:
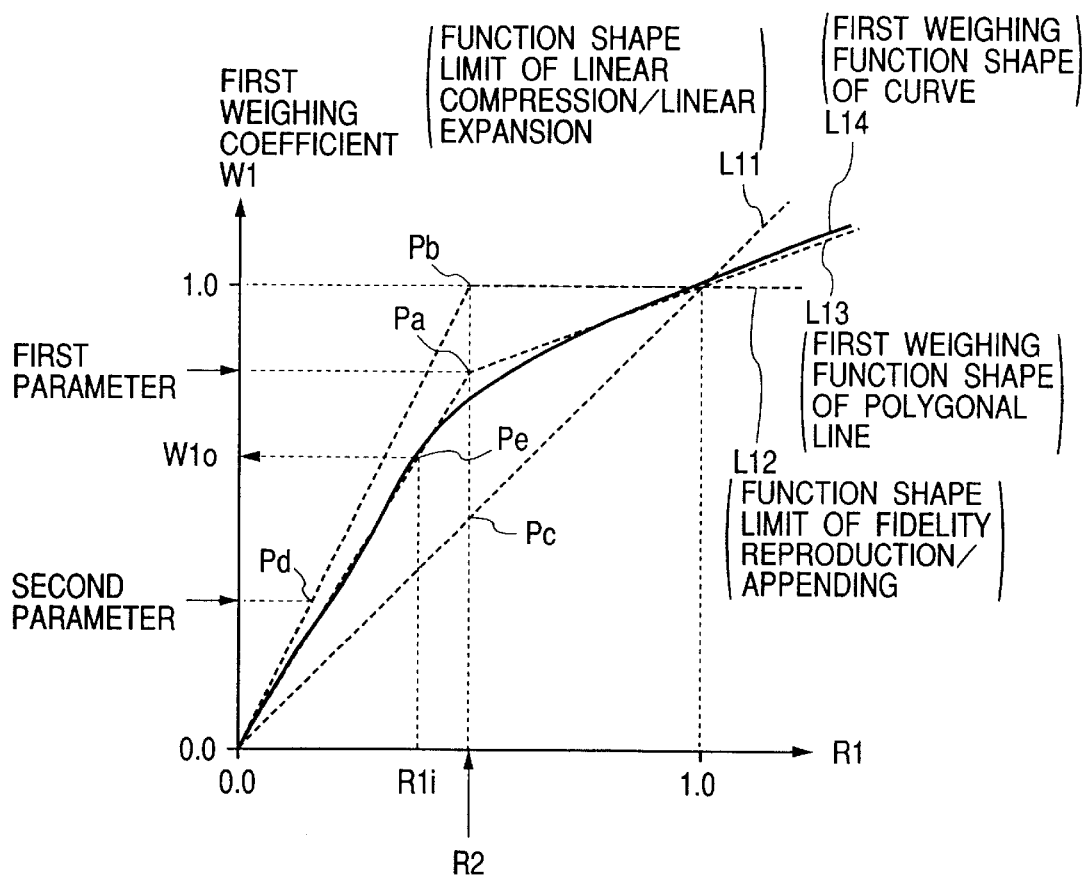
FIG. 10 is a view showing an example of a shape of a function used for deciding a first weighing coefficient.

FIG. 10 shows a shape of a 1-variable function in a case where a ratio R2 between the distance from the fixed point to the output color gamut point and the distance from the fixed point to the input color gamut point is 1 or less, namely, when compression is conducted as shown in FIG. 1 and FIG. 2. The shape is determined based on at least two parameters comprising a first parameter that is a first weighing coefficient W1 when the ratio R2 between the distance from the fixed point to the output color gamut point and the distance from the fixed point to the input color gamut point is an input (ratio between the distance from the fixed point to the conversion target point and a distance from the fixed point to the input color gamut point) R1, and a second parameter for deciding to set the largest proportion for the distance from the fixed point to the output color gamut point in which the coordinate is identical for the conversion target point and the first conversion point.

When the Y coordinate value for the point Pa in FIG. 10 corresponds to the first parameter and the point Pa is located on a function shape boundary L11 for linear compression/linear expansion, that is, when it is aligned with the point Pb, linear compression is conducted. When the point Pa is located on a function shape limit L12 for fidelity reproduction/clipping, namely, when it is aligned with the point Pc, the conversion target point and the first conversion point become located on the same point within the output color gamut surface C2, and is appended at the outside of the output color gamut surface C2. If Pa is located between them, conversion intermediate thereof is conducted.

The Y coordinate value for a point Pd corresponds to the second parameter, and a first weighing function shape L13 of polygonal line connecting an original point, point Pd, point Pa and point (1.0, 1.0) is formed.

In addition to the two parameters, another shape parameter may be set to form the first weighing function shape of polygonal line more specifically than the shape L13.

Then, smoothing processing is applied to the first weighing function shape L13 of polygonal line to determine a first weighing function shape L14 of curve and, finally, an actual value R11 for the ratio R1 between the distance from the fixed point to the conversion target point and the distance from the fixed point to the input color gamut point is inputted, and the Y coordinate value W1o at an intersection Pe with the first weighing function L14 of curve is outputted as a first weighing coefficient W1 as the final output.

As the actual processing, since it is possible to predict the output value when the ratio R1 between the distance from the constant point to the conversion target point and the distance from the fixed point to the input color gamut point is inputted by inputting the first parameter and the second parameter and setting a plurality of discrete points on the first weighing function shape L13 of polygonal line by the method, for example, of the invention of the prior application by using the smoothing parameter based on the data pair for the X-coordinate value and the Y-coordinate value for the points, it is not necessary to determine the first weighing function shape L14 of curve but the first weighing coefficient W1 can be determined directly from a plurality of discrete points on the first weighing function shape L13 of polygonal line.

Figure 11:
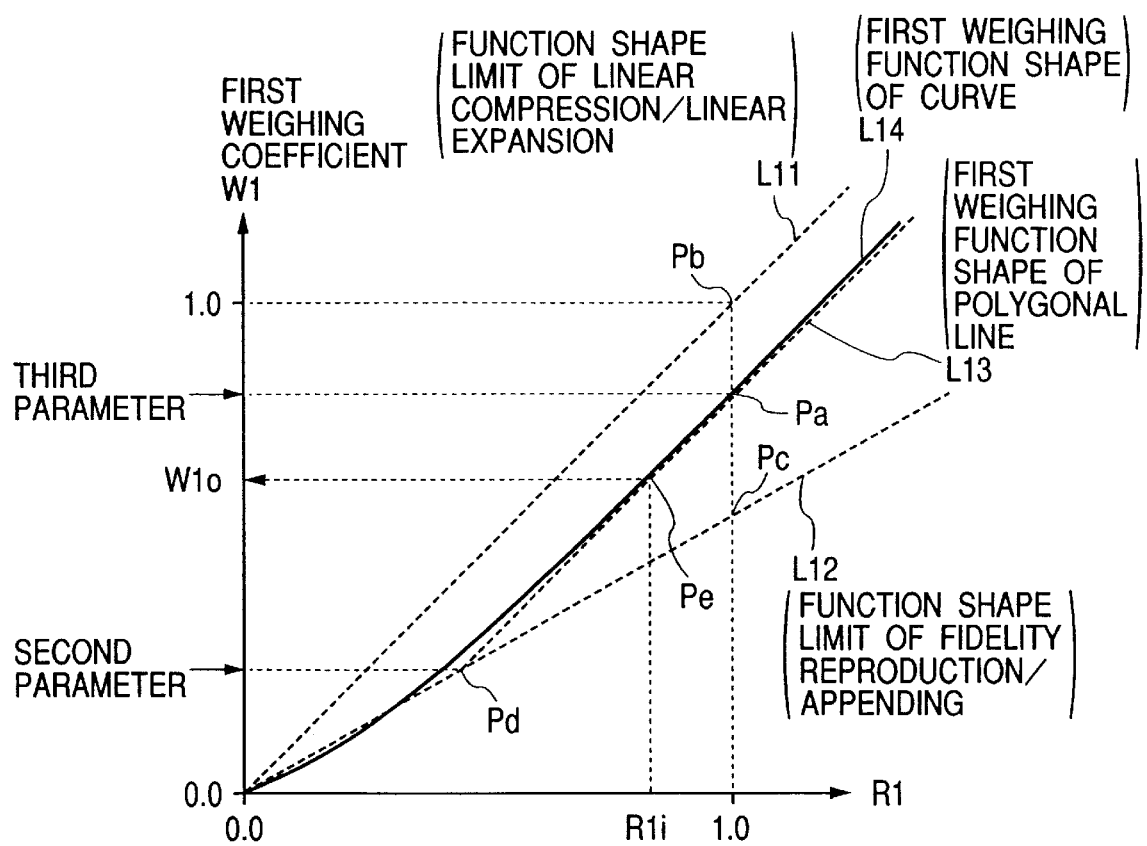
FIG. 11 is a view showing an example of a shape of a function used for deciding a first weighing coefficient.

FIG. 11 shows the shape of a 1-variable function when the ratio R2 between a distance from the fixed point to the output color gamut point and a distance from the fixed point to the input color gamut point is greater than 1, namely, when expansion is conducted. The shape is determined by at least two parameters comprising a third parameter as a first weighing coefficient W1 when the input R1 is 1 and a second parameter for deciding whether to set an upper limit proportion for the distance from the constant point to the output color gamut point in which the coordinate is identical for the conversion target point and the first conversion point.

The Y coordinate value for the point Pa in FIG. 11 corresponds to the third parameter. When the point Pa is located on the function shape limit L11 for linear compression/linear expansion, namely, if it is aligned with Pd, linear expansion is conducted, when the point Pa is located on the function shape L12 for fidelity reproduction/clipping, namely, when it is aligned with the point Pc, the conversion target point and the first conversion point become located on one identical point and, when Pa is located between them, conversion intermediate thereof is conducted.

The Y coordinate value for a point Pd in FIG. 11 corresponds to the second parameter and a first weighing function shape L13 of polygonal line connection the original point, the point Pd and, the point Pa is formed.

In addition to the two parameters, another shape parameter may be set to form the first weighing function shape of polygonal line more specifically than the shape L13.

Then, smoothing processing is applied to the first weighing function shape L13 of polygonal line to determine a first weighing function shape L14 of curve and, finally, an actual value R1$i$ for a ratio R1 between a distance from the fixed point to the conversion target point and a distance from the fixed point to the input color gamut point is inputted and the Y coordinate value W1$o$ for an intersection Pe on the first weighing function shape L14 of curve is outputted as the first weighing coefficient W1 as the final output.

As the actual processing, since it is possible to predict the output value when the ratio R1 between the distance from the constant point to the conversion target point and the distance from the fixed point to the input color gamut point is inputted by inputting the second parameter and the third parameter and setting a plurality of discrete points on the first weighing function shape L13 of polygonal line by the method, for example, of the invention of the prior application by using the smoothing parameter based on the data pair for the X-coordinate value and the Y-coordinate value for the points, it is not necessary to determine the first weighing function shape L14 of curve but the first weighing coefficient W1 can be determined directly from a plurality of discrete points on the first weighing function shape L13 of polygonal line.

As described above, since the method shown in FIG. 10 and FIG. 11 uses a technique similar in compression and expansion, if a restriction is provided such as making the second parameter identical, it can give an advantage of being capable of conducting compression and expansion even if a certain portion is compressed and a certain portion is extended in the color space region, without deteriorating the continuity therebetween.

(Second Weighing Coefficient Deciding Step)

In the entire step shown in FIG. 6, information SW2 for a second weighing coefficient used in the subsequent final conversion point calculation step 70 is then calculated in the second weighing coefficient deciding step 40 based on the conversion target point information S1, the fixed point information S0, the input color gamut point information S3 and the second weighing coefficient deciding parameter PW2.

In this second weighing coefficient deciding step 40, the second weighing coefficient is decided by conducting 1-variable function calculation of inputting a ratio between a distance from the fixed point to the conversion target point and a distance from the fixed point to the input color gamut point and outputting the second weighing coefficient. The shape of the 1-variable function is to be explained with reference to FIG. 12.

Figure 12:
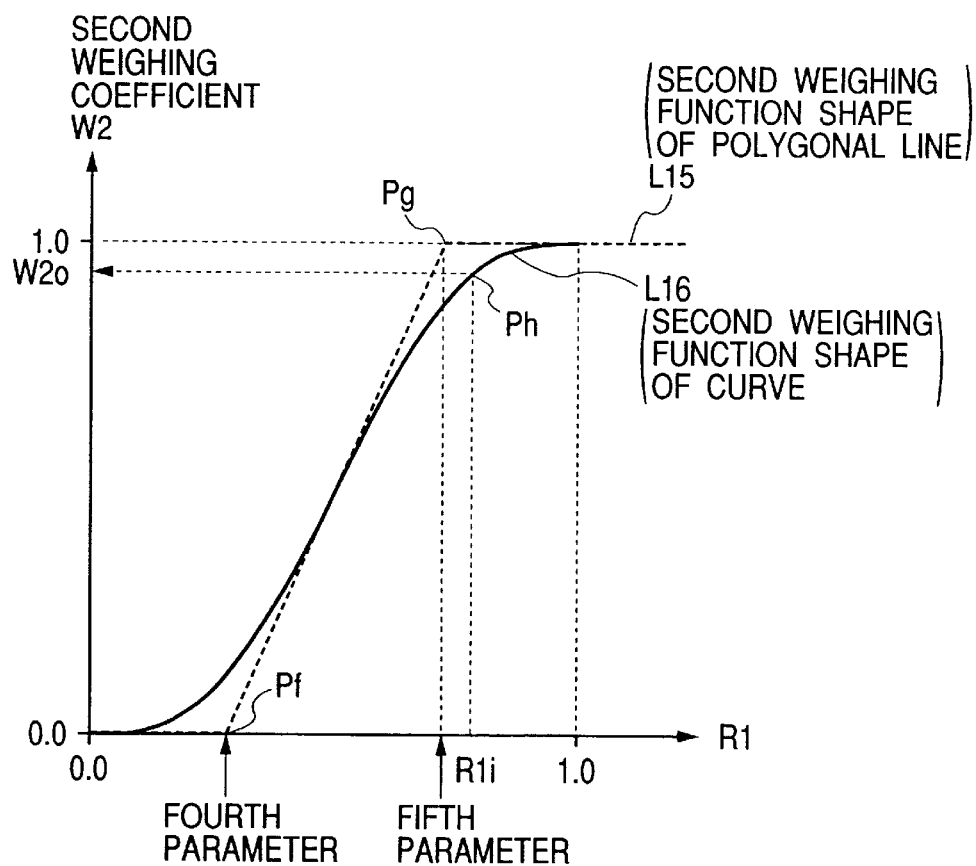
FIG. 12 is a view showing an example of a shape of a function used for deciding a second weighing coefficient.

FIG. 12 shows a shape of a 1-variable function for the second weighing coefficient W2 and the shape is decided by at least two parameters comprising a fourth parameter for deciding whether to set an upper limit of the proportion for the distance from the fixed point to the output color gamut point in which the coordinate is identical for the first conversion point and the final conversion point and a fifth parameter for deciding whether to set a lower limit of a proportion for a distance from the fixed point to the input color gamut point in which the coordinates for the second conversion point and the final conversion point are identical.

The X coordinate value for the point Pf in FIG. 12 corresponds to the fourth parameter, and the X-coordinate value for the point Pg corresponds to the fifth parameter by which a second weighing function shape L15 of a polygonal line connecting the original point, the point Pf, the point Pg and the point (1.0, 1.0) is formed.

Another shape parameter may be set in addition to the two parameters and the second weighing function shape of polygonal line may be formed more specifically than the shape L15.

Then, smoothing processing is applied to the second weighing function shape L15 of polygonal line to determine the second weighing function shape 116 of curve and, finally, an actual value R1$i$ for the ratio R1 between a distance from the fixed point to the conversion target point and a distance from the fixed point to the input color gamut point is inputted and the Y coordinate value W2$o$ at an intersection Ph on the second weighing function shape L16 of curve is outputted as the second weighing coefficient W2 for the final output.

As the actual processing, since it is possible to predict the output value when the ratio R1 between the distance from the fixed point to the conversion target point and the distance from the fixed point to the input color gamut point is inputted by inputting the fourth parameter and the fifth parameter and setting a plurality of discrete points on the second weighing function shape L15 of polygonal line by the method, for example, of the invention of the prior application by using the smoothing parameter based on the data pair for the X-coordinate value and the Y-coordinate value for the points, is not necessary to determine the second weighing function shape L16 of curve but the second weighing coefficient W2 can be determined directly from a plurality of discrete points on the second weighing function shape L15 of polygonal line.

(First Conversion Point Calculation Step)

In the entire step shown in FIG. 6, information S4 for the first conversion point P4 is calculated next in the first conversion point calculation step 50 by conducting weighted means of the first weighing coefficient, for the fixed point P0 and the output profile point P2 based on the fixed point information 80, the output color gamut point information S2 and the first weight coefficient information SW1 by using first weight coefficient.

In this case, since the first weighing coefficient is W1 and the output color gamut point information S2 is represented as GOUTo (ro, θo, φo) by the polar coordinate using the fixed point P0 as the center, calculation of the first conversion point information S4 corresponds to the determination of GOUTo (ro×W1, θo, φo) and, when it is reconverted to the orthogonal coordinate by using the coordinate value for the fixed point P0, first conversion information S4 can be obtained.

(Second Conversion Point Calculation Step)

In the entire step shown in FIG. 6, information S5 for the second conversion point P5 is calculated next in the second conversion point calculation step 60 based on the conversion target point information S1, the fixed information S0, the output color gamut surface information SC2, the correction data D1, the first weighing coefficient information SW1, and the output color gamut point calculation parameter PP2.

Calculation for the second conversion point P5 in the second conversion calculation step 60 enables continuous control for the direction of the color gamut compression or the color gamut expansion in each of the regions and corrects the bending of hue lines in the color space in view of the visual sense, to cope with a problem regarding the shape of the color gamut of the output apparatus, for example, a problem that the chroma of yellow is lowered extremely when compression is conducted at the same hue in the case of a printer.

Figure 13:
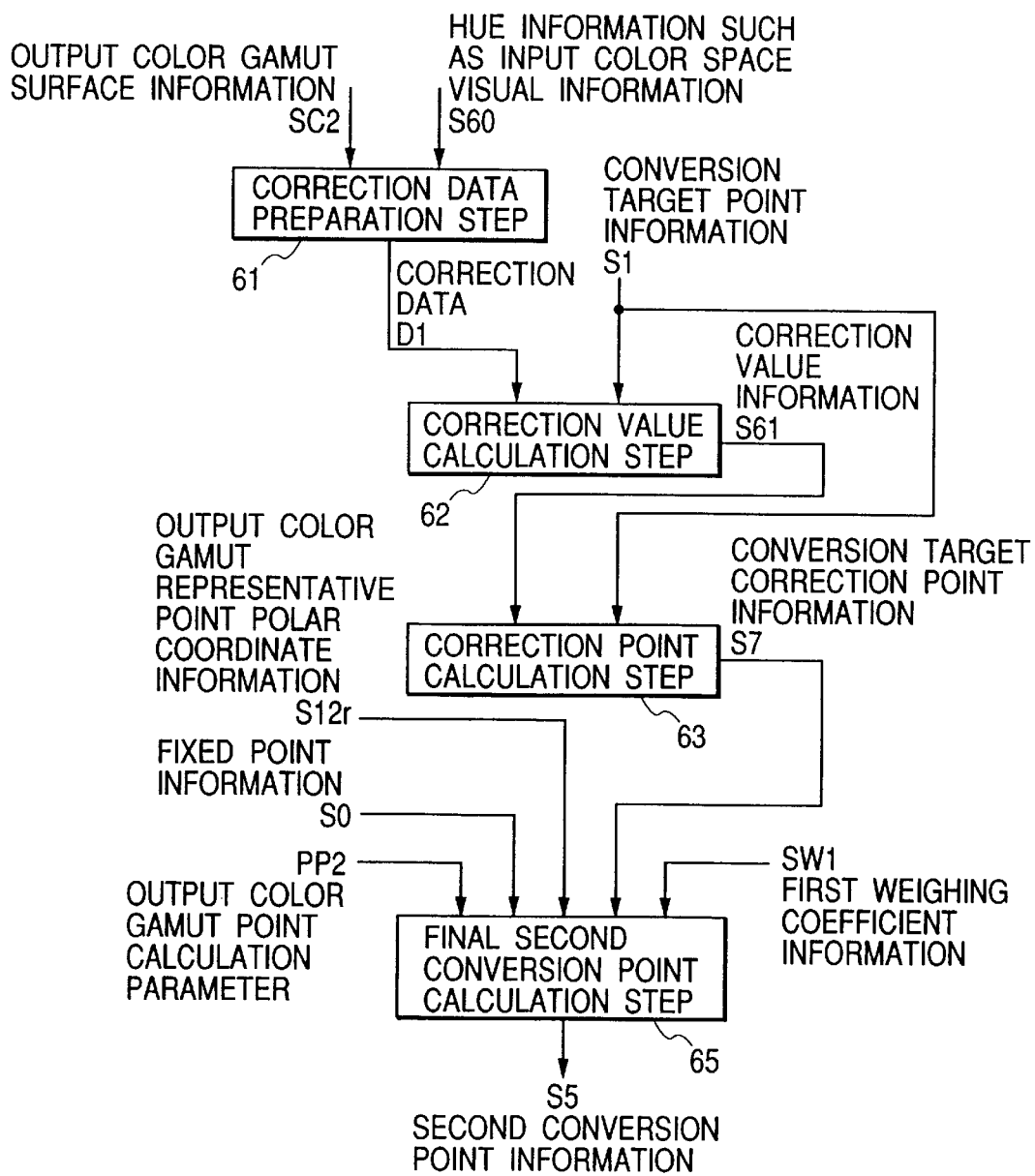
FIG. 13 is a view showing a second conversion point calculation step.

FIG. 13 shows a concrete example of the second conversion point calculation step 60 in which the second conversion point P5 is determined as a point on the assumed output color gamut surface C1 diminished from the output color gamut surface C2 as shown in FIG. 1 or on the assumed output color gamut surface enlarged from the output color gamut surface C2 contrary to the case of FIG. 1.

As described later, when the color coordinate values for the final conversion points regarding a plurality of conversion target points obtained by the image processing method according to the present invention are accommodated as the lattice point date for color gamut conversion in a multi-conversion table, the actual entire color gamut of the output apparatus can be utilized effectively and excessively unnecessary color gamut compression can be avoided by assuming the curved surface enlarged from the color gamut surface of the actual color gamut of the output apparatus as the color gamut surface of the color gamut of the assumed output apparatus.

In the example shown in FIG. 13, correction data D1 is provided at first in the correction data preparing step 61 based on the output color gamut surface information SC2 and the input color space visual sense iso-hue information S60.

The correction data D1 is for the calculation of the second conversion point P5 and, as shown in FIG. 1, correction vector data relative to the discrete color coordinate points over the entire input color space, and it can be determined by adding the correction vector data determined from the output color gamut surface information SC2 and the correction vector data determined from the input color space visual sense iso-hue information S60.

The correction vector data is determined from the input color space visual sense iso-hue information 60 by a method, for example, of setting a plurality of chroma grades to discrete color coordinate points on the base line L1, previously determining the degree of movement only for the hue that gives an appearance of an identical hue by a visual color matching experiment, determining an assumed correction point extending from the fixed point P0 to the iso-hue point by using a ratio between a distance from the fixed point P0 to the target point P1 and a distance from the fixed point P0 to the iso-hue point for the output color gamut surface C2, determining the vector from the conversion target point P1 to the assumed correction point as a correction vector and storing the same together with information showing the proportion (percentage) of the chroma set on the line from the fixed point P0 to the iso-hue point relative to distance from the constant point P0 to the output color gamut surface C2.

The correction vector can be determined from the output color gamut surface information SC2 by a method of using the correction vector data determined from the input color space visual color iso-hue information S60, then preparing various kinds of compression samples under the conditions that the value obtained by weighted addition for the hue difference, lightness difference and the chroma difference before and after the compression is minimized, determining the optimal value for the weighing ratio by a functional test for each of the regions and determining the correction vector data for the color on the base line L1 by inverse calculation from the ratio of the optimal value. The situation is the same also for the expansion.

Further, as a method of determining both of the correction vector data all at once, it is possible to determine the optimal conversion destination on the assumed output color gamut surface C1 by a functional test with respect to the discrete color coordinate points over the entire region of the input color space and inversely calculating the correction vector data based on the color coordinate.

It is possible to consider a method of directly using a vector from the conversion target point P1 to the second conversion point P5 on the assumed output color gamut surface C1 as the correction data D1. However, since it is difficult to conduct calculation such that the second conversion point P5 is always located on the assumed output color gamut surface C1 in view of the predicting accuracy in the next correction value calculation step 62, it is desirable for the correction data to be unlikely to be affected by the shape of the output color gamut surface C2 as in this example.

In the example shown in FIG. 13, information S61 for the correction value relative to the conversion target point P1 is calculated next in the corrected value calculation step 62 based on the correction data D1 and the conversion target point information S1.

Assuming the first weighing coefficient as p, the conversion target point P1 as GINo (Lo, ao, bo, p), the original point and the correction data D1 for calculating the second conversion point P5 as GCoe (Loi, aoi, boi, pe) and GCce (Lci, aci, bci, pe), in which i=1, Nc, in this case calculation of the correction value information S61 corresponds to the predicting of the prediction value GCoc (Loc, aoc, boc) with GINo (Lo, ao, bo, p) being the value to be predicted based on N units of the data pairs of Gcos (Loc, aoi, boi, pe) and Gcce (Lci, aci, bci, pe).

Accordingly, the information can be calculated by using the known method or the method of the prior application.

Then, in the correction point calculation step 63, the information S7 for the conversion target correction point P7 as shown in FIG. 1 that is the point after amendment of the conversion target point is calculated next in the correction point calculation step 63 based on the correction value information S61 and the conversion target S1. Specifically, the conversion target correction point GCc (Lc, ac, bc) can be determined by merely adding the correction value GCoc (Loc, aoc, boc) to the conversion target point GINo (Lo, ao, bo).

Then, in the second conversion point calculation final point 65, information S5 for the second conversion point P5 as an intersection between the correction like L5 as a line extending from the fixed point P0 to the conversion target correction point P7 and the assumed output color gamut surface C1 is calculated based on the conversion target correction point information S7, the fixed point information S0, the output color gamut representative point polar coordinate information S12r obtained in the polar coordinate conversion step 12 in FIG. 7, the first weighing coefficient information SW1 and the parameter PP2 for calculating the output color gamut point as shown in FIG. 1.

Assuming the conversion target correction point GCc (Lc, ac, bc) converted into the polar coordinate with the fixed point P0 as the center as Gcc (rc, θc, φc), since the output color gamut representative point polar coordinate is GOUTi (ri, θi, φi), in which i=1, Nout, calculation of the second conversion point P5 as the intersection between the correction line L5 and the assumed output color gamut surface C1 corresponds to the predicting of the prediction value (rc) for the value to be predicted as (θc, φc) based on N units of the data pair of (θi, φi) and p×ri. Accordingly, the conversion point can be calculated by using a known method or the method of the prior application.

Figure 14:
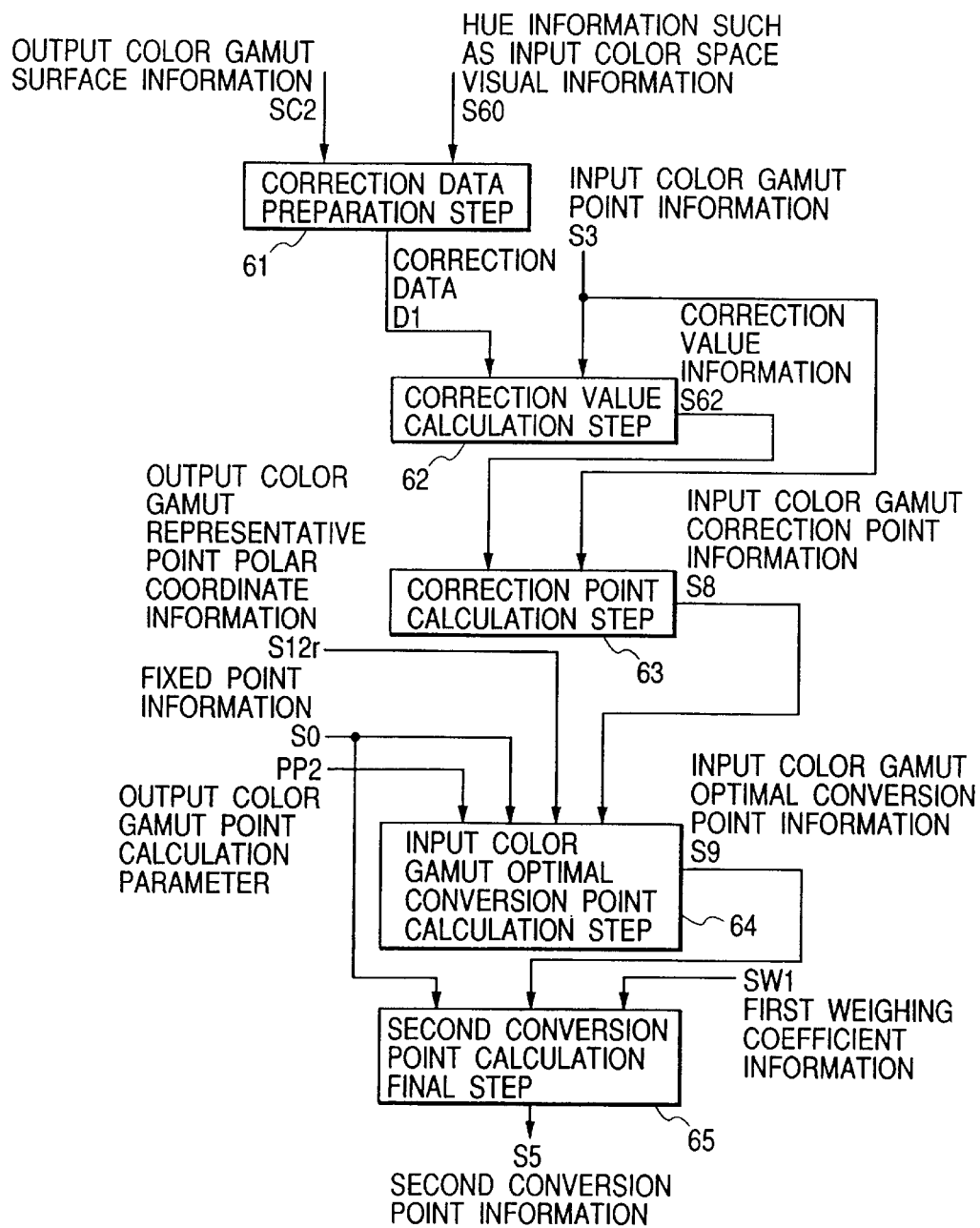
FIG. 14 is a view showing a second conversion point calculation step.

According to the second conversion point calculation step in the example shown in FIG. 13 described above, it is possible to correct the visual bending of the hue line in the color space accurately and to cope with a problem regarding the shape of the color gamut of the output apparatus by the second conversion point calculation step of the example in FIG. 13, and the second conversion point P5 can be calculated by a more simple and convenient method according to the example shown in FIG. 14.

In the example shown in FIG. 14, correction data D1 is prepared at first in the correction data preparation step 61 based on the output color gamut surface information SS2 and the input color space visual iso-hue information S60.

The correction data D1 in this case is for the calculation of the input color gamut correction point P8 and, further, the input color gamut optimal conversion point P9 as shown in FIG. 2, and is correction vector data relative to the discrete color coordinate points over the entire input color space and this can be determined by adding the correction vector data determined from the output color gamut surface information SC2 and the input color space visual iso-hue information S60.

The correction vector data may be determined from the input color space visual iso-hue information S60, for example, by using a method of determining the degree of movement only for the hue relative to the color on the base line L1 for giving the same appearance of hue as the output color gamut point P2 by a visual color matching experiment and setting a vector contrary thereto.

The correction vector data can be determined from the output color gamut surface information SC2, for example, by a method of using the correction vector data determined from the input color space visual iso-hue information 60, then, preparing various kinds of compression samples under the condition that the value obtained by weighing addition for the hue difference, the lightness difference and the chroma difference before and after the compression is minimized, determining the optimal value for the weighing ratio by a functional test for each of the regions and determining the correction vector data for the color on the base line 11 by inversely calculating from the ratio of the optimal value. The situation is the same also for the expansion.

As a method of determining both of the correction vector data all at once, it is possible to determine the optimal conversion destination on the output color gamut surface C2 by a functional test relative to the discrete color coordinate points of the input color space and inversely calculating the correction vector data from the color coordinate.

Then, in the correction value calculation step 62, information S62 for the correction value relative to the input color gamut point P3 is calculated based on the correction data D1 and the input color gamut information S3.

Assuming the input color gamut point P3 as GINo (Lo, ao, bo), and the original point and the correction data D1 as for the calculation of the input color gamut optimal conversion point P9 GCoe (Loi, aoi, boi) and GCce (Lci, aci, bci), in which i=1, Nc, calculation of the correction value information S62 corresponds to the predicting of the prediction value GCoc (Loc, aoc, boc) for the value to be predicted as GINc (Lo, ao, bo) based on N units of the data pair of GCoe (Loi, aoi, boi) and GCce (Lci, aci, bci). Accordingly, the information can be calculated by using a known method or the method of the prior application.

Then, in the correction point calculation step 63, information S8 for the input color gamut correction point P8 as shown in FIG. 2, that is, the point after the amendment for the input color gamut point P3 is calculated based on the correction value information S62 and the input color gamut point information S3. Specifically, the input color gamut correction point GCc (Lc, ac, bc) can be obtained by simply adding the correction value GCoc (Loc, aoc, boc) to the input color gamut point GINo (Lo, ao, bo).

Then, in the input color gamut optimal conversion point calculation step 64, the information S9 for the input color gamut optimal conversion point P9 as an intersection between the correction line L5 which is a line extending from the fixed point P0 to the input color gamut correction point P8 and the output color gamut surface C2, namely, the optimal conversion destination for the input color gamut point P3 as shown in FIG. 2 is calculated based on the input color gamut correction point information S8, fixed point information S0, the output color gamut representative point polar coordination information S12r obtained in the polar ordinate conversion step 12 in FIG. 7 and the parameter PP2 for calculating the output color gamut point.

Assuming the input color gamut correction point GCc (Lc, ac, bc) converted into the polar coordinate having the fixed point P0 as the center as GCc (rc, θc, φc), since the output color gamut representative point polar coordinate is GOUTi (ri, θi, φi), in which i=1, Nout, calculation of the input color gamut optimal conversion point P9 as an intersection between the correction line L15 and the output color gamut surface C2 corresponds to the predicting of the prediction value (rc) for the value to be predicted as (θc, φc) based on N units of the data pair for (θi, φi) and ri. Accordingly, calculation can be conducted by using a known method or the method of the prior application.

Then, in the second conversion point calculation final step 65, information S5 for the second conversion point P5 on the correction line L5 is calculated as shown in FIG. 2, by weighted mean of the fixed point P0 and the input color gamut optimal conversion point P9 by using the first weighing coefficient, based on the input color gamut optimal conversion point information S9, the fixed point information S0 and the first weighing coefficient information SW1.

Then, since the first weighing coefficient is W1 and the input color gamut optimal conversion P9 expressed by the polar coordinate with the fixed point p0 as the center is GCc (rc, θc, φc), calculation for the second conversion point information S5 corresponds to the determination of GCc (rc×W1, θc, φc) and, when this is reconverted into the orthogonal coordinate by using the coordinate value for the fixed point P0, the second conversion point information S5 is obtained.

(Final conversion Point Calculation Step)

In the entire step shown in FIG. 6, information S6 for the final conversion point P6 with respect to the conversion target point P1 is calculated finally in the final conversion point calculation step 70 by weighted mean of the first conversion point P4 and the second conversion point P5 using the second weighing coefficient based on the first conversion point information S4, the second conversion point information S5 and the second weighing coefficient information SW2.

Assuming the second weighing coefficient as W2, the first conversion point P4 as OUT1 (L1, a1, b1), and the second conversion point P5 as OUT2 (L2, a2, b2), calculation for the final conversion point P6 corresponds to the determination of OUT0 (L1×(1−W2)+L2×W2, a1×(1−W2)+a2×W2, b1×(1−W2)+b2×W2).

The final conversion point P6 is determined as a point on a segment connecting the first conversion point P4 with the second conversion point P5. In FIG. 1 and FIG. 2, the final conversion point curve C6 is a trace drawn from the fixed point P0 to the final conversion point P6 when the conversion target point P1 is gradually moved in the direction of the output color gamut point P2. The curve is along with a segment from the conversion target point P1 to the output color gamut point P2 at the initial state but it gradually changes its direction to the conversion target correction point p7, the input color gamut correction point P8 or the input color gamut optimal conversion point P9.

[Second Embodiment as the Image Processing Method]

Figure 15:
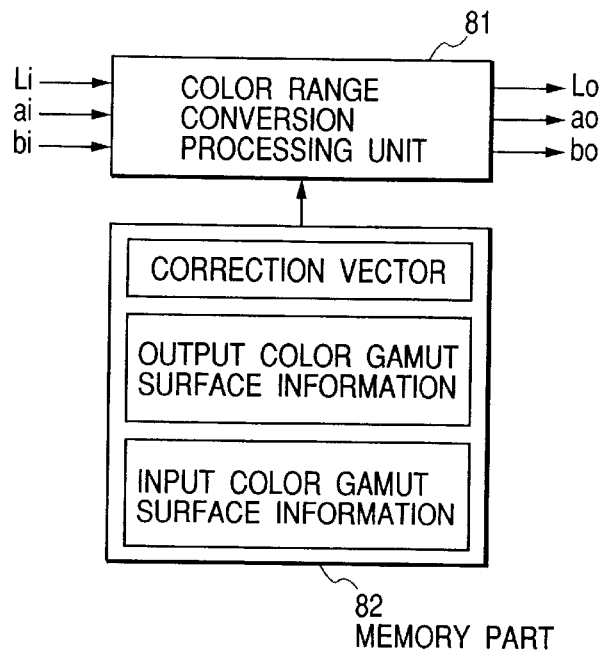
FIG. 15 is a view showing a second embodiment of the image processing method according to the present invention.

FIG. 15 shows a second embodiment of the image processing method according to the present invention. In this embodiment, a memory part 82 is disposed to a color gamut conversion processing unit 81 and the memory part 82 previously contains a correction vector for correcting the visual bending of a hue line for each of the regions of the color space, that is, for each region of the CIELAB color space in this example.

Further, the memory part 82 contains information showing the color gamut surface for the color gamut and the output color gamut surface as the closed curved surface in the color gamut of the output apparatus, and an input color gamut surface as the color gamut surface for the color gamut of an input image or a partial region thereof.

Then, the color gamut conversion processing unit 81 converts the color gamut of input image data Li, ai, bi by using the correction vector stored in the memory part 82 in accordance with the color gamut of the output apparatus and the color gamut of the input image by the output color gamut surface information and the input color gamut surface information stored in the memory part 82 and outputs image data Lo, ao, bo after the conversion.

According this procedure, optimal color gamut conversion can be conducted in accordance with the color gamut of the output apparatus and the color gamut of the input image and, particularly, visual bending of the hue line can be corrected reliably in each of the regions of the color space.

[Third Embodiment as the Image Processing Method]

Figure 20:
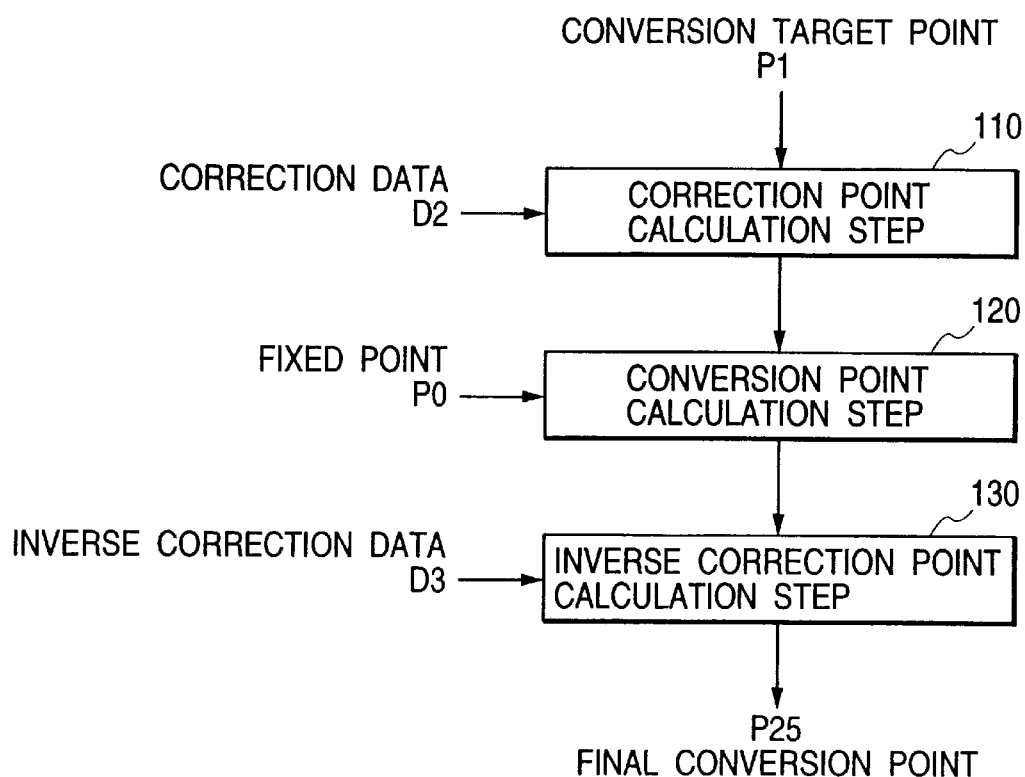
FIG. 20 is a view showing a third embodiment of the image processing method according to the present invention.

FIG. 20 shows a preferred embodiment of the third invention of setting a certain point in an input image or a partial region thereof, namely, a color coordinate value for a pixel as a conversion target point P1 and converting the same into a final conversion point P25 of a color coordination value present on the assumed conversion line L3 and adaptable to the color gamut of the output apparatus.

The method comprises a correction point calculation step 110, a conversion point calculation step 120 and an inverse collection point calculation step 130.

In this embodiment, explanation is to be made for an example intended to conduct compression in accordance with the color gamut of the output apparatus taking distortion of the CIELAB color space into consideration. Accordingly, the assumed conversion line L3 in this example is an iso-hue line.

(Correction Point Calculating Step)

The correction point calculation step 110 calculates the correction point P21 by using the conversion target point P1 and a collection data D2.

The correction D2 in this embodiment is defined as a group of three-dimensional vectors having a correction amount from a plurality of discrete points in the CIELAB color space to the direction L*, the direction a* and the direction b*.

Figure 21:
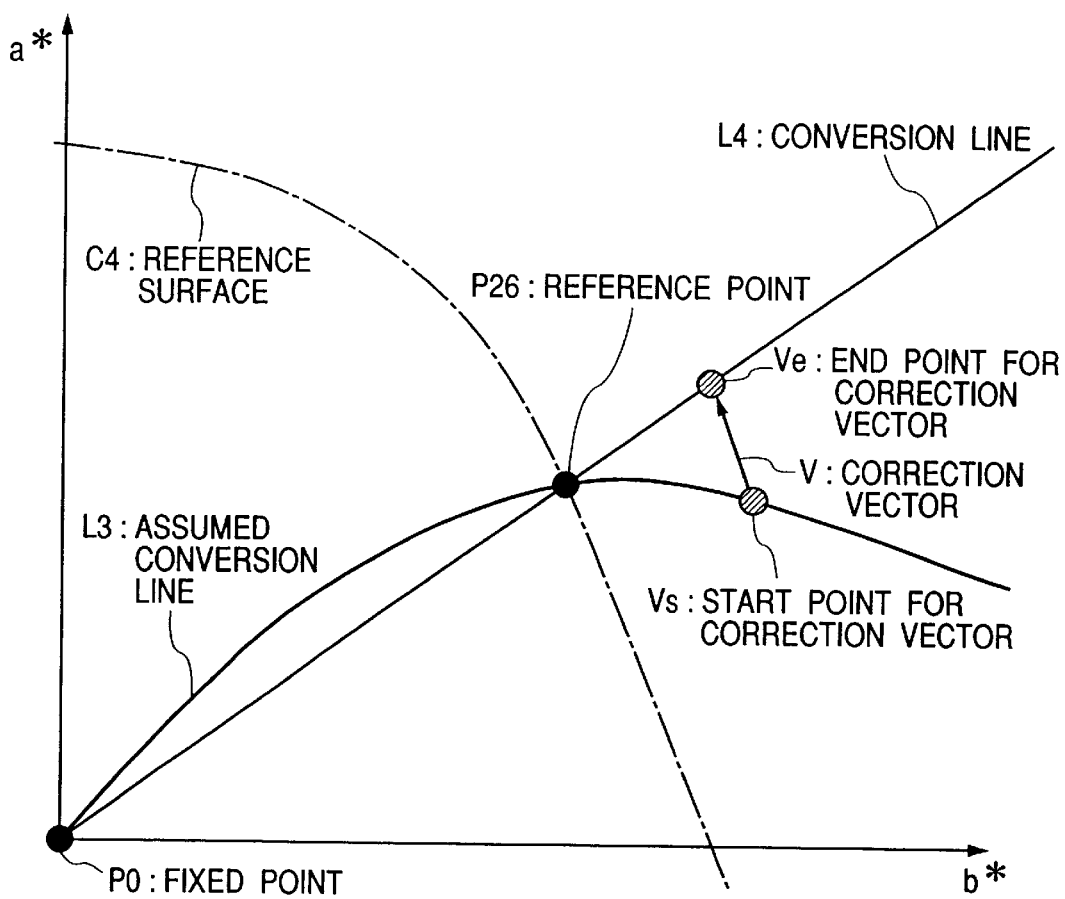
FIG. 21 is a view for explaining correction data in the image processing method according to the third invention.

FIG. 21 is a view explaining a correction vector V constituting the correction data D2 for correcting the distortion of the CIELAB color space. The graph is expressed in a two-dimensional manner with a* axis and b* axis of the CIELAB color space.

The start point Vs for the correction vector V is a conversion target point to which the correction vector V corresponds. The end point Ve for the correction vector V is determined depending on the correction amount for correcting the distortion of the color space in direction of each the axis.

Specifically, if an assumed conversion line L3 passing the start point Vs and the fixed point Po determined uniquely by the start point Vs, with an iso-hue and with uniformly varying lightness and chroma is present, an intersection between the assumed conversion line L3 and a closed curved surface referred to as a reference surface C4 is defined as a reference point P26. The reference surface C4 may be any of closed curved surfaces that intersects a semi-line extending from a fixed point P0 corresponding to an arbitrary point to the arbitrary point only for once. In this case, the output color gamut surface C2 is used as the closed curved surface C4.

The reference point P26 is a point to which the start point Vs is converted upon conversion of the start point Vs into the point on the reference surface considering the strain of the color space. Then, a point situating on the line L4 passing the reference point P26 and the fixed point P0 and has an equal chroma value with the start point Vs is defined as an end point Ve. In this way, the correction data D2 can be prepared from the assumed conversion line L3 based on the reference surface C4.

The correction point P21 is calculated by determining a correction vector corresponding to the conversion target point P1, namely, starting from the conversion target point P1 by interpolating the three-dimensional vector group of the correction data D2 prepared as explained above, and adding the correction vector to the conversion target point P1.

(Conversion Point Calculation Step)

The conversion point calculation step 120 converts the correction point P21 calculated in the correction point calculation in the correction point calculation step 110 into the point on the semi-line extending from the fixed point P0 to the correction point P21, corresponding to the color gamut of the output apparatus.

In this embodiment, the conversion point P24 was calculated based on the first weighing coefficient W1, the output color gamut point P23 and the fixed point P0 relative to the correction point P21 calculated in the input color gamut point calculation step, the output color gamut point calculation step and the first weighing coefficient deciding step as described specifically with respect to the embodiment of the first invention. However, it is necessary to read the conversion target point P1 as the correction point P21, the first conversion point P4 as the conversion point P24 and the base line L1 as the correction base line in each of the steps. Specifically, the conversion point P24 was calculated according to the formula:

P24=P0+W1×(P23−P0).

In this embodiment, while a calculation method for the conversion point adaptable to the original document was used, any of compression or expansion methods adaptable to the color gamut of the output apparatus may be used so long as the conversion point can be calculated on the correction base line in this third invention. Accordingly, the conversion point P24 may always be determined as the output color gamut point P23 or an existing method may be used.

Further, if the difference between the correction base line L2 and the assumed conversion line L3 in the color gamut of the output apparatus is small enough, the conversion point calculated may be used as the final conversion point. In this case, the succeeding inverse correction point calculation step can be saved.

(Inversion Correction Point Calculation Step)

The inversion correction point calculation step 130 calculates the final conversion point with respect to the conversion point P24 calculated in the conversion point calculation step 120 by applying an inverse correction data D3 corresponding to the conversion point P24.

The inverse correction data D3 in this embodiment is defined as a group of three-dimensional vectors having the amount of correction from a plurality of discrete points dispersed in the CIELAB color space to the L* direction, a* direction and b* direction.

The inversion correction vector constituting the inversion correction data D3 is equal with the correction vector contained in the correction data D2 with the start point and the end point being replaced with each other. That is, if a correction vector V corresponding to the conversion target point Vs to be contained in the correction data D2 is present, the inverse correction vector V'=−V corresponding to the conversion point Ve can be added as the inversion correction data D3. Accordingly, D2 and D3 as different data can be maintained, or the correction data D2 can be replaced with the inverse correction data D3.

In this way, an inverse correction vector V' corresponds to the conversion point P24 is calculated from the correction data D2 or the inverse correction data D3 by interpolation or prediction. Then, the final conversion point P25 is calculated by adding the inverse correction vector V' to the conversion point P24.

In this embodiment, the final conversion point P25 is described as an appropriate conversion point for the conversion target point P1, but the final conversion point P25 may be determined as the second conversion point explained in the first embodiment and the final conversion point can be calculated from the second conversion point and the corresponding first conversion point.

In accordance with the method described above, the conversion target point P1 on the assumed conversion line L3 can also be converted accurately into the final conversion point P25 on the assumed conversion line L3. In this embodiment, since the assumed conversion line is determined as the iso-hue line, the final conversion point P25 can be calculated while preserving the hue of the conversion target point P1 as it is.

While the assumed conversion line has been explained to be assumed as the iso-hue line, the present invention is not restricted only thereto and, for example, an assumed conversion line for approaching to a more preferred color such as a memory color or a assumed conversion line prepared by the synthesis thereof may be used.

(Preferred Embodiment as Coefficient Generating and Imaging Processing Device)

In the image processing method described previously with reference to FIG. 1 to FIG. 14 and FIG. 18 to FIG. 21, pixel values for the final conversion points were determined one by one for the individual pixel value of the input image or the partial region thereof as the conversion target points and the entire input image or the partial region thereof may be converted for the color gamut but this processing is time consuming and not practical.

Then, in the present invention, a coefficient for the color gamut conversion is further generated by using the image processing method described previously and the coefficient thus generated is placed in the image processing apparatus so that the color gamut for the input image or the partial region thereof can be converted at a high speed and conveniently.

FIRST EXAMPLE

Figure 16:
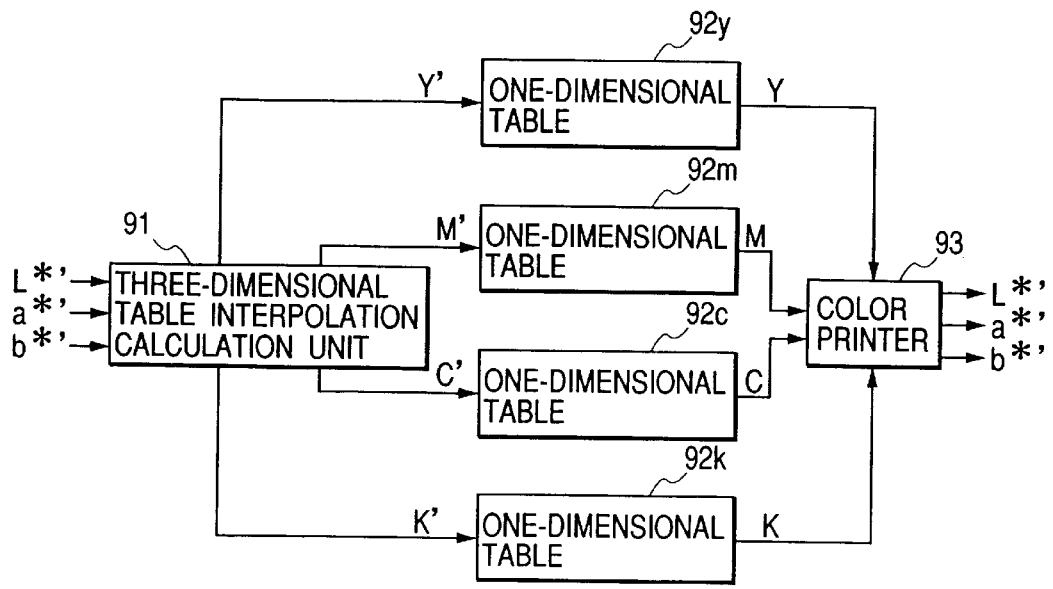
FIG. 16 is a view showing a first embodiment of an image processing apparatus according to the present invention.

FIG. 16 shows an example of an image processing apparatus according to the present invention. This example shows a case of conversing the color gamut of the input image and outputting the same to a color printer 93 by a three-dimensional table interpolation calculation unit 91 comprising a three-dimensional table and an interpolating calculation unit and four one-dimensional tables 92y, 92m, 92c and 98k.

All the lattice point data contained in the three-dimensional table is formed as the final conversion points described above by determining the input values corresponding to the respective lattice point as the conversion target point and converted into the color space depending on the output apparatus, namely, a color printer in this example.

For converting into the color space depending on the output apparatus, since the three-dimensional space at the input is converted into the four-dimensional space at the output, the degree of freedom is reduced by one grade such as determination for the method of forming a black print.

Further, since the lattice points include the point situating to the outside of the color gamut of the color gamut of the input image and not all the data obtained as the final conversion points situate within the color gamut of the output apparatus, it is necessary to use a method of high extrapolating performance. In this regard, the method of the prior application can be used.

The feature that not all the obtained final conversion data are contained in the color gamut of the output apparatus constitutes a major feature of the present invention that the data can be extrapolated also to the conversion target points out of the color gamut of the input image, whereby excessively unnecessary color gamut compression can be avoided.

Particularly, when clipping is conducted by the selection of the parameter, excessively unnecessary color gamut compression can be avoided since the data can be reproduced at a high fidelity in the color gamut of the actual output apparatus by using the method of the present invention for the generation of the lattice point data by assuming the surface just outside of the color gamut of the output apparatus, for example, a range of the color gamut where YMCK% corresponds to −10% to 110%, as the color gamut of the assumed output apparatus, while taking advantage of the extrapolation.

When the data obtained as the final conversion points by the methods described above is contained in the three-dimensional table of the three-dimensional table interpolating calculation unit 91 as the lattice point data, the input/output relation for the one-dimensional tables 92y, 92m, 92c and 92k is set as the next step.

Since not all the final conversion points are contained in the color gamut of the output apparatus, namely, the input values of the one-dimensional table are not always within a range from 0% to 100%, it is necessary in this case to make an input range somewhat broader than the output range and the output range is always contained in the color gamut of the output apparatus.

The extent of broadening the input range varies depending on the extent of calculation error and the extent of smoothing for the input color gamut but it may be set such that the input range is set from −10% to 10%, in which the output values are set to 0% for the input values of 0% or lower and the output values are set to 100% for the input value of 100% or more and the input values and the output values are made identical between them. The actual color printer causes aging change and such aging change can be absorbed by the setting of the one-dimensional tables.

Subsequently, the system may be operated as an image processing apparatus. In this case, the three-dimensional table of the three-dimensional table interpolating calculation unit 91 is retrieved in this example by upper digit bits for the L*'a*'b*' data, the lattice point data is read out of the three-dimensional table, the read out lattice point data is put to interpolating calculation in the interpolating calculation unit by lower bits for the input L*'a*b*' data to output the color space data depending on the output apparatus, namely, Y'M'C'K'% in this embodiment which are substantially adaptable to the color gamut of the output apparatus from the three-dimensional table interpolating calculating unit 91.

As the interpolating method, a method of conducting interpolating calculation while dividing a unitary cubic body into six trigonal cones, a method of conducting interpolating calculation while dividing the unitary cubic body into two trigonal pillars, or applying interpolation as it is to the unitary cubic body are known and any of the methods may be used.

Y'M'C'K'%, in this embodiment, from the three-dimensional table interpolating calculation unit 91 are converted finally into the color space data depending on the output apparatus to be contained finally in the color gamut of the output apparatus, namely, YMCK% in this embodiment.

Then, YMCK% is outputted to the color printer 93 and, as a result, color of print images, namely, L*'a*'b*' are outputted in this embodiment.

In a case where the input image is regionally divided into partial regions and the content of the color processing is changed on every partial region, the partial region data after processing is written into a page memory of the color printer 93, the next partial region is processed after changing the lattice point data of the three-dimensional table interpolating calculation unit 91 and, when processing is completed for all of the partial regions, the data is finally print out.

The input color space is not restricted to CIELAB and the method is applicable also to other color space such as RGB, XYZ and YIQ. Further, it is also applicable in the same manner as the color printer, for example, to a color display excepting that the three one-dimensional tables may be used and excepting for the conditions to be noted for setting the color gamut of the output apparatus described previously.

SECOND EXAMPLE

Figure 17:
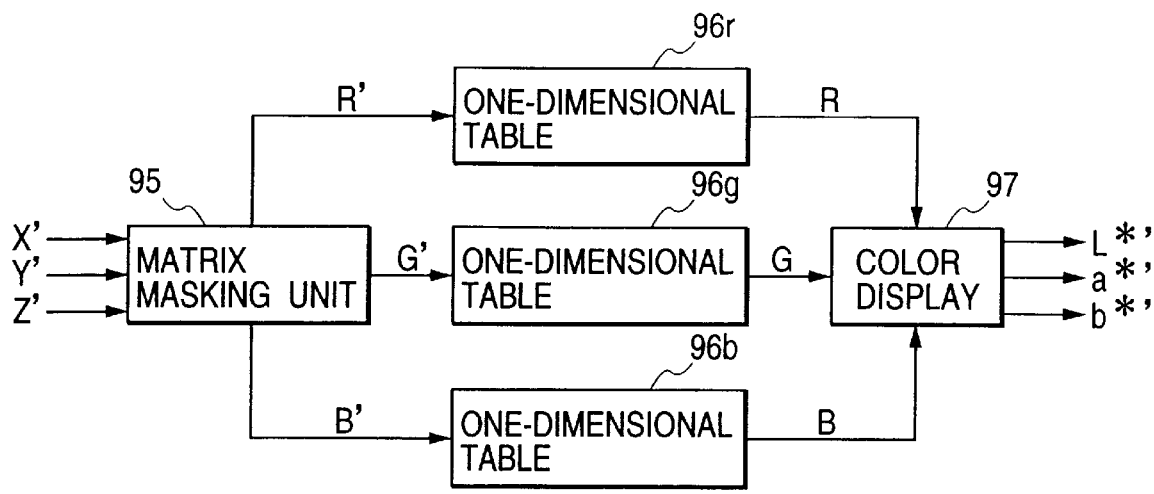
FIG. 17 is a view showing a second embodiment of the image processing apparatus according to the present invention.

FIG. 17 shows another example of the image processing apparatus according to the present invention. This example shows a case in which the color gamut of the input image is converted by a matrix masking unit 95 and one-dimensional tables 96r, 96g and 96b and outputted to a color display 97, in which a coefficient for the calculation processing is set to the matrix masking unit 95.

For this purpose, all the lattice points in the color gamut of the input image or the partial regions thereof are assumed as the input lattice points, the final conversion points are calculated by the method described above while determining the input values corresponding thereto as the conversion target points and the calculation result converted into the color space depending on the output apparatus are determined as the output lattice point data, and the coefficient is set by the least square method from the input lattice point data and the output lattice point data.

For conversion into the color space depending on the output apparatus, since not all the data obtained as the final conversion points is contained in the color gamut of the output apparatus because of the calculation error or smoothing for the input color gamut described above, it is necessary to use a method of high extrapolating performance and, for example, the method of the prior application can be used.

Then, input/output relation is set for the one-dimensional tables 96r, 96g, 96b. Since not all the final conversion points are contained within the color gamut of the output apparatus, that is, the input values for the one-dimensional tables are not always present between 0 to 255, it is necessary to make the input range somewhat broader than the output range and that the range of the output is always contained within the color gamut of the output apparatus.

The extent for broadening the input range varies depending on the degree of the calculation error and smoothing for the input color gamut, and it may be set, for example, such that the input range is set from −25 to 28%, in which the output values are set to zero for the input values of 0 or lower, the output values are set to 255 for the input values of 255 or higher, and the input value and the output values are set identical at the intermediate thereof. The actual color display causes aging change, and it is possible to absorb the aging change by the setting of the one-dimensional table.

Subsequently, the system may be operated as an image processing apparatus. In this case, the data for the input image or the partial region thereof, X'Y'Z' data in this embodiment, is put to matrix calculation processing in a matrix masking unit 95, and color space data depending on the output apparatus substantially adaptable to the output apparatus, namely, R'G'B' in this embodiment is outputted from the matrix masking unit 95.

The calculation methods include various methods from a basic calculation at low order such as 3×3 matrix to calculation at high order with addition of higher order term or a cross term, and the method may be selected while considering the balance between the required calculation accuracy and the calculation cost.

R'G'B' data, in this embodiment, from the matrix masking unit 95 is finally converted by the one-dimensional tables 96*t*, 96*g* and 96*b* into a color space data depending on the output apparatus contained in the color gamut of the output apparatus, namely, RGB data in this embodiment.

Then, the RGB data is outputted to the color display 97 and, as a result, display expression colors, namely, L*'a*'b*' in this embodiment are outputted.

When the input image is regionally divided into partial regions and the content of the color processing is changed on every partial region, the partial region data after processing is written into a page memory of the color display 97 and, further, the succeeding partial region is processed after changing the coefficient of the matrix masking unit 95 and finally indicated on the display after completing the processing to all the partial regions.

The input color space is not restricted to XYZ but the invention is applicable also to other color spaces such as RGB, CIELAB and YIQ. Further, the invention is not restricted to the color display but applicable also to a color printer in the same manner as in the color display excepting that a function of forming a black print is added to the matrix masking unit 95, four one-dimensional tables are used and that the conditions to be noted for the setting of the color gamut of the output apparatus described above are different.

The present invention can provide the following advantageous effects.

(1) Only the range requiring color gamut compression can be compressed depending on the distribution of the input image. Accordingly, lowering of the chroma can be minimized and the color difference with the original can be reduced.

(2) The direction of the color gamut compression can be controlled continuously for each of the ranges. Accordingly, an optimal compressing direction can be selected in accordance with the bending of the hue line of the input color space and the shape of the color gamut of the output apparatus.

(3) The amount of the color gamut compression also including the clipping can be controlled continuously. Accordingly, various extents of compression or expansion can be selected by merely changing the parameter depending on the user's preference.

(4) When the color gamut is compressed by a color converter of a multi-dimensional DLUT interpolating calculation type, excessively unnecessary color gamut compression can be avoided, particularly, upon clipping. Accordingly, occurrence of color difference or pseudo contour formed in the color gamut of the output apparatus can be prevented.

What is claimed is:

1. An image processing apparatus for converting a color input image or a partial region thereof in accordance with a color gamut of a color image output apparatus, comprising:

a correction point calculation part that corrects a conversion target point and calculating a correction point by using correction data corresponding to said conversion target point;

a first conversion point calculation part that compresses or expands a conversion target point to a point on a line connecting a fixed point in the color gamut of said output apparatus that can be determined uniquely based on said conversion target point with said conversion target point thereby calculating a first conversion point;

a second conversion point calculation part that compresses or expands a correction point to a point on a line connecting said fixed point with said correction point thereby calculating a second conversion point; and a final conversion point calculation part that determines a final conversion point for said conversion target point by using said first conversion point and said second conversion point.

2. An image processing apparatus for converting a color input image or a partial region thereof in accordance with a color gamut of a color image output apparatus, comprising:

an output color gamut point calculation part that determines a color gamut point as an intersection between a base line that is a line extending from a fixed point in the color gamut of said output apparatus to a conversion target point and an output color gamut surface as a color gamut surface of the color gamut or a closed curved surface in the color gamut of said output apparatus;

an input color gamut point calculation part that determines an input color gamut point as an intersection between said base line and an input color gamut surface as the color gamut surface of the color gamut of said input image or said partial region thereof;

a first conversion point calculation part that determines a first conversion point on said base line using said fixed point, said output color gamut point and a first weighing coefficient;

a second conversion point calculation part that determines a second conversion point by using correction data for correcting a compressing direction or an expanding direction and said first weighing coefficient; and a final conversion point calculation part that determines a final conversion point for said conversion target point by using said first conversion point, said second conversion point and a second weighing coefficient.

3. An image processing method of converting a color input image or a partial region thereof in accordance with a color gamut of a color image output apparatus, wherein said conversion processing in accordance with the color gamut of said output apparatus is conducted while correcting the direction and the extent of compression/expansion by using correction data, comprising:

a first conversion point calculation step of compressing or expanding a conversion target point to a point on a line connecting a fixed point in the color gamut of said output apparatus, that can be determined uniquely based on said conversion target point, with said conversion target point thereby calculating a first conversion point;

a second conversion point calculation step of calculating a correction point by using correction data corresponding to said conversion target point and compressing or expanding said correction point to a point on a line connecting said fixed point with said correction point thereby calculating a second conversion point; and a final conversion point calculation step of determining a final conversion point for said conversion target point by using said first conversion point and said second conversion point.

4. The image processing method according to claim 3, further comprising an inverse correction point calculation step of correcting said first conversion point or said second conversion point calculated by compressing or expanding the correction point based on inversion correction data corresponding to said first conversion point or said second conversion point.

5. The image processing method according to claim 3, further comprising the steps of:

determining a first weighing coefficient which is a ratio of compressing or expanding said conversion target point or said correction point by using an intersection between a line connecting a fixed point in the color gamut of said output apparatus that can be determined uniquely based on said conversion target point with said conversion target point or said correction point and the input color gamut surface and the output color gamut surface; and conducting compression or expansion along a line connecting said fixed point with said conversion target point and/or correction point based on said first weighing coefficient.

6. The image processing method according to claim 3, further comprising:

an output color gamut point calculation step of determining a color gamut point as an intersection between a base line that is a line extending from the fixed point in the color gamut of said output apparatus to the conversion target point and an output color gamut surface that is the color gamut surface of the color gamut or the closed curved surface in the color gamut of said output apparatus; and an input color gamut point calculation step of determining an input color gamut point as an intersection between said base line and an input color gamut surface that is the color gamut surface of a color gamut of said input image or said partial region, wherein the first conversion point is determined by the first conversion point calculation step by using said fixed point, said output color gamut point and a first weighing coefficient, the second conversion point is determined by the second conversion point calculation step by using correction data for correcting the compressing direction or expanding direction and the first weighing coefficient, and the final conversion point is determined by the final conversion point calculation step by using said first conversion point, said second conversion point and a second weighing coefficient.

7. An image processing method according to any one of claims 5 and 6, wherein said first weighing coefficient is determined by conducting 1-variable function calculation of inputting a ratio R1 between a distance from said fixed point to said conversion target point and a distance from said-fixed point to said input color gamut point and outputting said first weighing coefficient, and a shape of the 1-variable function is determined, if a ratio R2 between a distance from said fixed point to said output color gamut point and a distance from said fixed point to said input color gamut point is 1 or less, by at least two parameters comprising a first parameter in which said ratio R2 is the first weighing coefficient at input R1 and a second parameter for determining whether to set a proportion for the distance from said fixed point to said output color gamut point in which the coordinate for said conversion target point and said first conversion point is identical, and if said ratio R2 is 1 or greater, by at least two parameters comprising a third parameter, which are the first weighing coefficient if said input R1 is 1, and the second parameter.

8. The image processing method according to claim 6, wherein said second conversion point calculation step comprises:

a correction data preparation step of previously calculating discrete data as said correction data based on a iso-hue information of input color space and information for said output color gamut surface;

a correction value calculation step of calculating a correction value corresponding to said conversion target point by using the correction data thus calculated;

a correction point calculation step of determining a conversion target correction point by adding the correction value thus calculated to said conversion target-point data;

an output color gamut representative point preparation step of previously calculating a plurality of representative points on said output color gamut surface;

a polar coordinate conversion step of converting a coordinate for the plurality of output color gamut representative points thus calculated into a polar coordinate with said fixed point as a center; and a final second conversion point calculation step of determining said second conversion point as an intersection between a line extending from said fixed point to said conversion target correction point and an assumed output color gamut surface diminishing or enlarging said output color gamut surface with said first weighing coefficient based on the polar coordinate for the plurality of output color gamut representative points thus converted.

9. The image processing method according to claim 6, wherein said second conversion point calculation step comprises:

a correction data preparing step of previously calculating discrete data as said correction data based on a iso-hue information of input color space and the information for said output color gamut surface;

a correction value calculation step of calculating a correction value corresponding to said input color gamut point by using the correction data thus calculated;

a correction point calculation step of determining an input color gamut correction point by adding the correction value thus calculated to said input color gamut point data;

an output color gamut representative point preparing step of previously calculating a plurality of representative points on said output color gamut surface;

an input color gamut optimal conversion point calculation step of determining an input color gamut optimal conversion point as an intersection between a line extending from said fixed point to said input color gamut correction point and said output color gamut surface based on the plurality of output color gamut representative points thus calculated; and a final second conversion point calculation step of determining said second conversion point by weighing mean of the input color gamut optimal conversion point thus calculated and said fixed point by using said first weighing coefficient.

10. The image processing method of claim 6, wherein said second weighing coefficient is decided by conducting 1-variable function calculation of inputting a ratio R1 between a distance from said fixed point to said conversion target point and a distance from said fixed point to said input color gamut point and outputting said second weighing coefficient, and a shape of the 1-variable function is decided by at least two parameters comprising a fourth parameter for deciding to set an upper limit of a proportion for the distance from said fixed point to said input color gamut point in which the coordinate is identical for said first conversion point and said final conversion point, and a fifth parameter for deciding to set a lower limit of a proportion for the distance from said fixed point to said input color gamut point in which the coordinate is identical for said second conversion point and said final conversion point.

11. The image processing method of claim 6, wherein said output color gamut point calculation step comprises:

an output color gamut representative point preparation step of previously calculating a plurality of representative points on said output color gamut surface;

a polar coordinate conversion step of converting the coordinate for the plurality of output color gamut representative points thus calculated into a polar coordinate with said fixed point as a center; and a final output color gamut point calculation step of determining said output color gamut point based on the polar coordinate information after said conversion and the polar coordinate information of said conversion target point having said fixed point as a center.

12. The image processing method of claim 6, wherein said input color gamut point calculation step comprises:

a polar coordinate conversion step of converting pixel values of said input image or said partial region thereof into a polar coordinate with said fixed point as a center;

an input color gamut representative point selection step of determining a pixel having a maximum absolute value on each local expected angle of the polar coordinate after said conversion as a plurality of representative points on said input color gamut surface; and a final input color gamut point calculation step of determining said input color gamut point based on the representative point information thus obtained and the information for said conversion target point.

13. The image processing method of claim 6, wherein said input color gamut calculation step comprises:

an input color gamut representative point candidate selection step of selecting a plurality of input color gamut representative point candidates from pixel values of said input image or said partial region thereof;

a polar coordinate conversion step of converting pixel values for the input color gamut representative point candidates thus obtained into a polar coordinate with said fixed point as a center;

an input color gamut representative point selection step of determining pixels each having a maximum absolute value on every local expected angle of the polar coordinate after said conversion as a plurality of representative points on said input color gamut surface; and a final input color gamut point calculation step of determining said input color gamut point based on the representative point information thus obtained and the information for said conversion target point.

14. The image processing method of claim 6, wherein said input color gamut point calculation step determines said input color gamut point based on the information for the plurality of representative points on said input color gamut surface previously stored and the information for said conversion target point when the color gamut of said input image or said partial region thereof is known or defined.

15. A method of forming lattice point data which comprises the steps of:

determining a final conversion point by the image processing method according to claim 3 using a plurality of representative points in a color gamut of a color input image or a partial region thereof as a conversion target point; and determining color coordinate values for the plurality of final conversion points thus obtained or color coordinate values after converting the same into a color space depending on an output apparatus as lattice point data to be contained in a multi-dimensional conversion table used for converting the color gamut of a color input image or a partial region thereof.

16. A method of forming a conversion coefficient which comprises the steps of:

determining a final conversion point by an image processing method according to claim 3 using a plurality of representative points in a color gamut of a color input image or a partial region thereof as conversion target points; and forming a coefficient for converting the color gamut of the color input image or the partial region thereof based on a corresponding relation between the conversion target points thus obtained and the final conversion points.

17. An image processing apparatus for converting a color input image or a partial region thereof in accordance with a color gamut of a color image output apparatus, comprising:

a pre-stage conversion processing unit having a multi-dimensional conversion table in which lattice point data formed by the lattice point data forming method according to claim 15 is stored, retrieving said multi-dimensional conversion table using the pixel values of said input image or said partial region as the address, and conducting interpolating calculations for the read out lattice point data using the pixel values for said input image or said partial region thereof to obtain image values of a color space substantially adaptable to the color gamut of said output apparatus and depending on said output apparatus; and a post-stage conversion processing unit having a plurality of one-dimensional conversion tables for converting pixel values obtained from said pre-stage conversion processing unit into image values finally contained in the color gamut of said output apparatus.

18. An image processing apparatus for converting a color input image or a partial region thereof in accordance with a color gamut of a color image output apparatus, comprising:

a pre-stage conversion processing unit for conducting matrix calculations for the pixel values of said input images or said partial region thereof using the coefficient formed by the conversion coefficient forming method according to claim 16, to obtain image values of a color space substantially adaptable to the color gamut of said output apparatus and depending on said output apparatus; and a post-stage conversion processing unit having a plurality of one-dimensional conversion tables for converting pixel values obtained from said pre-stage conversion processing unit into image values finally contained in the color gamut of said output apparatus.

19. A recording medium in which a processing program for executing the image processing method according to claim 3 is described.

20. A memory medium in which lattice point data formed by the lattice point data forming method of claim 15 is written.

21. A memory medium in which a coefficient formed by the conversion coefficient forming method of claim 16 is written.

22. The image processing method according to claim 3, wherein the correction data is constituted of correction vectors corresponding to a plurality of target points in a color space, and said correction vector mapping said target point to a point on a semi-line extending from said fixed point to a reference point, said reference point of said semi-line being at an intersection between an ideal conversion curve passing through said target point and said fixed point determined uniquely by said target point and a reference closed curved surface having said fixed point at the inside thereof.

23. A memory medium in which the correction data calculated by the image processing method of claim 22 is written.

24. A system comprising the image processing apparatus of claim 17, and capable of being operated on a computer for outputting a color image to a printer or a display as said color image output apparatus.

25. An image processing method of converting a color input image or a partial region thereof in accordance with a color gamut of a color image output apparatus, wherein said conversion processing in accordance with the color gamut of said output apparatus is conducted while correcting the direction and the extent of compression/expansion by using correction data, comprising:

a correction point calculation step for correcting a conversion target point and calculating a correction point by using correction data corresponding to said conversion target point;

a compression/expansion processing step of compressing or expanding a correction point to a point on a line connecting a fixed point in the color gamut of said output apparatus, that is determined uniquely based on said conversion target point, with said correction point; and an inverse correction point calculation step of correcting said conversion point or said second conversion point calculated by compressing or expanding the correction point based on inversion correction data corresponding to said conversion point or said second conversion point.

26. The image processing method of claim 25, further comprising the steps of:

determining a first weighing coefficient which is a ratio of compressing or expanding said conversion target point or said correction point by using an intersection between a line connecting a fixed point in the color gamut of said output apparatus that can be determined uniquely based on said conversion target point with said conversion target point or said correction point and the input color gamut surface and the output color gamut surface; and conducting compression or expansion along a line connecting said fixed point with said conversion target point and/or correction point based on said first weighing coefficient.

27. The image processing method of claim 26, wherein said first weighing coefficient is determined by conducting 1-variable function calculation of inputting a ratio R1 between a distance from said fixed point to said conversion target point and a distance from said fixed point to said input color gamut point and outputting said first weighing coefficient, and a shape of the 1-variable function is determined, if a ratio R2 between a distance from said fixed point to said output color gamut point and a distance from said fixed point to said input color gamut point is 1 or less, by at least two parameters comprising a first parameter in which said ratio R2 is the first weighing coefficient at input R1 and a second parameter for determining whether to set a proportion for the distance from said fixed point to said output color gamut point in which the coordinate for said conversion target point and said first conversion point is identical, and if said ratio R2 is 1 or greater, by at least two parameters comprising a third parameter, which are the first weighing coefficient if said input R1 is 1, and the second parameter.

28. The image processing method of claim 26, further comprising:

an output color gamut representative point preparation step of previously calculating a plurality of representative points on said output color gamut surface;

a polar coordinate conversion step of converting the coordinate for the plurality of output color gamut representative points thus calculated into a polar coordinate with said fixed point as a center; and a final output color gamut point calculation step of determining said output color gamut point based on the polar coordinate information after said conversion and the polar coordinate information of said conversion target point having said fixed point as a center.

29. The image processing method of claim 26, further comprising:

a polar coordinate conversion step of converting pixel values of said input image or said partial region thereof into a polar coordinate with said fixed point as a center;

an input color gamut representative point selection step of determining a pixel having a maximum absolute value on each local expected angle of the polar coordinate after said conversion as a plurality of representative points on said input color gamut surface; and a final input color gamut point calculation step of determining said input color gamut point based on the representative point information thus obtained and the information for said conversion target point.

30. The image processing method of claim 26, further comprising:

an input color gamut representative point candidate selection step of selecting a plurality of input color gamut representative point candidates from pixel values of said input image or said partial region thereof;

a polar coordinate conversion step of converting pixel values for the input color gamut representative point candidates thus obtained into a polar coordinate with said fixed point as a center;

an input color gamut representative point selection step of determining pixels each having a maximum absolute value on every local expected angle of the polar coordinate after said conversion as a plurality of representative points on said input color gamut surface; and a final input color gamut point calculation step of determining said input color gamut point based on the representative point information thus obtained and the information for said conversion target point.

31. A recording medium in which a processing program for executing the image processing method of claim 25 is described.

32. A method of forming lattice point data which comprises the steps of:
   determining a final conversion point by the image processing method of claim 25 using a plurality of representative points in a color gamut of a color input image or a partial region thereof as a conversion target point; and
   determining color coordinate values for the plurality of final conversion points thus obtained or color coordinate values after converting the same into a color space depending on an output apparatus as lattice point data to be contained in a multi-dimensional conversion table used for converting the color gamut of a color input image or a partial region thereof.

33. A method of forming a conversion coefficient which comprises the steps of:
   determining a final conversion point by an image processing method of claim 25 using a plurality of representative points in a color gamut of a color input image or a partial region thereof as conversion target points; and
   forming a coefficient for converting the color gamut of the color input image or the partial region thereof based on a corresponding relation between the conversion target points thus obtained and the final conversion points.

34. An image processing apparatus for converting a color input image or a partial region thereof in accordance with a color gamut of a color image output apparatus, comprising:
   a pre-stage conversion processing unit having a multi-dimensional conversion table in which lattice point data formed by the lattice point data forming method of claim 32 is stored, retrieving said multi-dimensional conversion table using the pixel values of said input image or said partial region as the address, and conducting interpolating calculations for the read out lattice point data using the pixel values for said input image or said partial region thereof to obtain image values of a color space substantially adaptable to the color gamut of said output apparatus and depending on said output apparatus; and
   a post-stage conversion processing unit having a plurality of one-dimensional conversion tables for converting pixel values obtained from said pre-stage conversion processing unit into image values finally contained in the color gamut of said output apparatus.

35. An image processing apparatus for converting a color input image or a partial region thereof in accordance with a color gamut of a color image output apparatus, comprising:
   a pre-stage conversion processing unit for conducting matrix calculations for the pixel values of said input images or said partial region thereof using the coefficient formed by the conversion coefficient forming method of claim 33, to obtain image values of a color space substantially adaptable to the color gamut of said output apparatus and depending on said output apparatus; and
   a post-stage conversion processing unit having a plurality of one-dimensional conversion tables for converting pixel values obtained from said pre-stage conversion processing unit into image values finally contained in the color gamut of said output apparatus.

36. A system comprising the image processing apparatus of claim 34, and capable of being operated on a computer for outputting a color image to a printer or a display as said color image output apparatus.

37. A memory medium in which lattice point data formed by the lattice point data forming method of claim 32 is written.

38. A memory medium in which the coefficient formed by the conversion coefficient forming method of claim 33 is written.

39. The image processing method of claim 25, wherein the correction data is constituted of correction vectors corresponding to a plurality of target points in a color space, and said correction vector mapping said target point to a point on a semi-line extending from said fixed point to a reference point, said reference point of said semi-line being at an intersection between an ideal conversion curve passing through said target point and said fixed point determined uniquely by said target point and a reference closed curved surface having said fixed point at the inside thereof.

40. A memory medium in which the correction data calculated by the image processing method of claim 39 is written.

41. The image processing method according to any one of claims 3, 4, 25 and 26, further comprising the steps of:
   previously setting a correction vector for correcting visual bending of a hue line for each region of a color space; and
   converting said input image or said partial region thereof by using the correction vector.

42. The image processing method of claim 41, further comprising the steps of:
   previously providing, together with said correction vector, information showing the color gamut surface of the color gamut and an output color gamut surface as a closed curved surface in the color gamut of said output apparatus and information showing an input color gamut surface as a color gamut surface for the color gamut of said input image or said partial region thereof; and
   converting said input image or said partial region by using said correction vector, said output color gamut surface information and said input color gamut surface information.

43. An image processing apparatus for converting a color input image or a partial region thereof in accordance with a color gamut of a color image output apparatus, comprising a data storing part that contains a correction vector for correcting visual bending of a hue line set in each of the regions of the color gamut, in which said input image or said partial region thereof is converted by using the correction vector from the data storing part,
   wherein the apparatus further comprises an information storing part that contains information showing the color gamut surface of a color gamut or an output color gamut surface as a closed curved surface in said color gamut of the output apparatus, and information showing the input color gamut surface as the color gamut surface of the color gamut of said input image or said partial region thereof, in which the input image or the partial region thereof is converted by using the information from said information storing part and the correction vector from said data storing part.

44. A system comprising the image processing apparatus of claim 43, and capable of being operated on a computer for outputting a color image to a printer or a display as said color image output apparatus.

45. An image processing apparatus for converting a color input image or a partial region thereof in accordance with a color gamut of a color image output apparatus, comprising:
   a correction point calculation part that calculates a correction point by correcting a conversion target point using correction data corresponding to said conversion target point; and a compression/expansion processing part that calculates a conversion point by compressing or expanding a correction point to a point on a line connecting a fixed point in a color gamut of said output apparatus that can be determined uniquely based on said conversion target point with said correction point, wherein the apparatus comprises an inversion correction point calculation part that corrects said conversion point or said second conversion point calculated by compressing or expanding the correction point based on inverse correction data corresponding to said conversion point or said second conversion point.

46. The apparatus of claim 1, wherein the apparatus comprises an inversion correction point calculation part that corrects said conversion point or said second conversion point calculated by compressing or expanding the correction point based on inverse correction data corresponding to said conversion point or said second conversion point.

* * * * *